US012568223B2

(12) United States Patent
Liu et al.

(10) Patent No.: US 12,568,223 B2
(45) Date of Patent: Mar. 3, 2026

(54) RESTRICTIONS ON DECODER SIDE MOTION VECTOR DERIVATION BASED ON CODING INFORMATION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 102 days.

(21) Appl. No.: 17/579,994

(22) Filed: Jan. 20, 2022

(65) Prior Publication Data

US 2022/0150508 A1     May 12, 2022

Related U.S. Application Data

(63) Continuation of application No. 17/071,489, filed on Oct. 15, 2020, now abandoned, which is a (Continued)

(30) Foreign Application Priority Data

Oct. 22, 2018   (WO) ................ PCT/CN2018/111224
Dec. 25, 2018   (WO) ................ PCT/CN2018/123407

(51) Int. Cl.
*H04N 19/139*          (2014.01)
*H04N 19/105*          (2014.01)
(Continued)

(52) U.S. Cl.
CPC ......... *H04N 19/139* (2014.11); *H04N 19/105* (2014.11); *H04N 19/176* (2014.11); *H04N 19/189* (2014.11)

(58) Field of Classification Search
CPC .. H04N 19/139; H04N 19/105; H04N 19/176; H04N 19/189; H04N 19/157; H04N 19/52
See application file for complete search history.

(56) References Cited

U.S. PATENT DOCUMENTS 11,082,712 B2    8/2021  Liu et al.
11,134,268 B2    9/2021  Liu et al.
(Continued)

FOREIGN PATENT DOCUMENTS

CN       102131091 A     7/2011
CN       103081470 A     5/2013
(Continued)

OTHER PUBLICATIONS

Chen et al., Generalized bi-prediction for inter coding, May 26-Jun. 1, 2016, Joint Video Exploration Team (JVET) of ITU-T SG 16 WP 3 and ISO/IEC JTC 1/SC 29/WG 11 (Year: 2016).*
(Continued)

*Primary Examiner* — Francis Geroleo
(74) *Attorney, Agent, or Firm* — Conley Rose, P.C.

(57)          ABSTRACT

Devices, systems and methods for digital video coding, which includes restrictions on decoder-side motion vector derivation based on coding information, are described. An exemplary method for video processing includes making a decision, for a conversion between a current block of a video and a bitstream representation of the video, regarding a selective enablement of a decoder side motion vector derivation (DMVD) tool for the current block, the DMVD tool deriving a refinement of motion information signaled in the
(Continued)

2750

Making a decision, based on decoded motion information associated with a current block of a video, regarding a selective enablement of a decoder side motion vector derivation (DMVD) tool for the current block, the DMVD tool deriving a refinement of motion information signaled in a bitstream representation of the video     2752

Performing, based on the decision, a conversion between the current block and the bitstream representation     2754 bitstream representation, and the conversion using a merge mode and motion vector differences that are indicated by a motion direction and a motion magnitude, and performing, based on the decision, a conversion between the current block and the bitstream representation.

20 Claims, 30 Drawing Sheets

Related U.S. Application Data continuation of application No. PCT/IB2019/058976, filed on Oct. 22, 2019.

(51) Int. Cl.
  *H04N 19/176*        (2014.01)
  *H04N 19/189*        (2014.01)

(56)                References Cited

U.S. PATENT DOCUMENTS

| | | | |
|---|---|---|---|
| 11,178,422 B2 | 11/2021 | Liu et al. | |
| 2006/0023788 A1 | 2/2006 | Otsuka et al. | |
| 2006/0291561 A1 | 12/2006 | Seong et al. | |
| 2014/0126638 A1 | 5/2014 | Sievers | |
| 2014/0161189 A1 | 6/2014 | Zhang et al. | |
| 2015/0016537 A1* | 1/2015 | Karczewicz | H04N 19/176 |
| | | | 375/240.18 |
| 2016/0227244 A1 | 8/2016 | Rosewarne | |
| 2016/0345011 A1 | 11/2016 | Naing et al. | |
| 2017/0251213 A1* | 8/2017 | Ye | H04N 19/159 |
| 2017/0332095 A1 | 11/2017 | Zou et al. | |
| 2018/0184117 A1* | 6/2018 | Chen | H04N 19/52 |
| 2018/0192071 A1 | 7/2018 | Chuang et al. | |
| 2018/0192072 A1 | 7/2018 | Chen et al. | |
| 2018/0199057 A1 | 7/2018 | Chuang et al. | |
| 2018/0241998 A1 | 8/2018 | Chen et al. | |
| 2018/0270500 A1 | 9/2018 | Li et al. | |
| 2018/0278949 A1* | 9/2018 | Karczewicz | H04N 19/513 |
| 2018/0278950 A1* | 9/2018 | Chen | H04N 19/44 |
| 2018/0278966 A1 | 9/2018 | Lim et al. | |
| 2018/0316929 A1 | 11/2018 | Li et al. | |
| 2018/0332298 A1 | 11/2018 | Liu et al. | |
| 2019/0020895 A1* | 1/2019 | Liu | H04N 19/61 |
| 2019/0132606 A1* | 5/2019 | Su | H04N 19/577 |
| 2019/0222848 A1* | 7/2019 | Chen | H04N 19/105 |
| 2019/0230350 A1 | 7/2019 | Chen et al. | |
| 2019/0238880 A1 | 8/2019 | Lee | |
| 2019/0238883 A1* | 8/2019 | Chen | H04N 19/573 |
| 2019/0320197 A1* | 10/2019 | Chen | H04N 19/139 |
| 2020/0107015 A1 | 4/2020 | Seo et al. | |
| 2020/0204807 A1 | 6/2020 | Ye | |
| 2020/0236395 A1 | 7/2020 | Lee et al. | |
| 2020/0366902 A1* | 11/2020 | Jeong | H04N 19/521 |
| 2020/0413089 A1 | 12/2020 | Liao et al. | |
| 2021/0029362 A1 | 1/2021 | Liu et al. | |
| 2021/0029378 A1 | 1/2021 | He et al. | |
| 2021/0051339 A1 | 2/2021 | Liu et al. | |
| 2021/0076063 A1 | 3/2021 | Liu et al. | |
| 2021/0092377 A1 | 3/2021 | Zhang et al. | |
| 2021/0092435 A1 | 3/2021 | Liu et al. | |
| 2021/0250604 A1* | 8/2021 | Su | H04N 19/174 |

FOREIGN PATENT DOCUMENTS

| | | | |
|---|---|---|---|
| CN | 104170381 A | 11/2014 | |
| CN | 104871543 A | 8/2015 | |
| CN | 107409225 A | 11/2017 | |
| CN | 107534766 A | 1/2018 | |
| CN | 107770524 A | 3/2018 | |
| CN | 107787582 A | 3/2018 | |
| CN | 107925775 A | 4/2018 | |
| CN | 108293131 A | 7/2018 | |
| CN | 108432250 A | 8/2018 | |
| CN | 108541375 A | 9/2018 | |
| CN | 110431842 A | 11/2019 | |
| CN | 112913241 A | 3/2024 | |
| CN | 112913240 A | 8/2024 | |
| EP | 1104197 A2 | 5/2001 | |
| EP | 3264769 A1 | 1/2018 | |
| EP | 3264768 A1 | 3/2018 | |
| KR | 20170030968 A | 3/2017 | |
| KR | 20180084660 A | 7/2018 | |
| WO | 2017084512 A1 | 5/2017 | |
| WO | 2017197146 A1 | 11/2017 | |
| WO | 2018113658 A1 | 6/2018 | |
| WO | 2018156628 A1 | 8/2018 | |
| WO | 2018163857 A1 | 8/2018 | |
| WO | 2018171796 A1 | 9/2018 | |
| WO | 2018175756 A1 | 9/2018 | |
| WO | 2018205954 A1 | 11/2018 | |
| WO | 2020061082 A1 | 3/2020 | |
| WO | 2020069076 A1 | 4/2020 | |

OTHER PUBLICATIONS

Xiu et al. "CE9-related: A Simplified Bi-directional optical flow (BIO) design based on Combination of CE9.5.2 test 1 and CE9.5.3," Joint Video Experts Team (JEVT) of ITU-SG 16 WP 3 and ISO/IEC JTC 1/SC 29/WG 11, 11th Meeting: Ljubljana, SI, Jul. 10-18, 2018. document JVET-K0485, 2018.

Non-Final Office Action from U.S. Appl. No. 17/086,935 dated Jan. 4, 2021.

Non-Final Office Action from U.S. Appl. No. 17/087,033 dated Jan. 26, 2021.

Non-Final Office Action from U.S. Appl. No. 17/109,821 dated Feb. 19, 2021.

Alshin et al. "Non TEB3: Bi-directional Optical Flow for Inter-layer Texture Prediction," Joint Collaborative Team on Video Coding (JCT-VC) of ITU-T SG 16 WP 3 and ISO/IEC JTC 1/SC 29/WG 11, 12th meeting, Geneva, CH, Jan. 14-23, 2013, document JCTVC-L0084, 2013.

Chen et al. "Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0029, 2016.

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Chen et al. "CE9-Related: Simplified DMVR with Reduced Internal Memory," Joint Video Exploration Team of ISO/IEC JTC 1/SC 29/WG 11 and ITU-T SG 16, 12, Oct. 3-12, 2018, document No. JVET-L0098, 2018.

Chiang et al. "CE10.1.1: Multi-Hypothesis Prediction for Improving AMVP Mode, Skip, or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Esenlik et al. "Simplified DMVR for Inclusion in VVC," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0670, 2018.

Flierl et al. "Rate-Constrained Multihypothesis Prediction for Motion-Compensated Video Compression," IEEE Transactions on Circuts and Systems for Video Technology, Nov. 2002, 12(11):957-969.

httpsjvet.hhi.fraunhofer.desvnsvn_HMJEMSoftwaretags HM-16.6-JEM-7.0. (only website).

(56) References Cited

OTHER PUBLICATIONS

"High Efficiency Video Coding" Series H: Audiovisual and Multi-media Systems: Infrastructure of Audiovisual Services—Coding of Moving Video, ITU-T, H.265, 2018.

Huang et al. "A Technical Description of MediaTek's Proposal to the JCT-VC CfP," Joint Collaborative Team on Video Coding (JCT-VC) of ITUU-T SG16 WP3 and ISO/IEC JTC1/SC29/WG11, 1st meeting, Dresden, DE, Apr. 15-23, 2010, document JCTVC-A109, 2010.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Laroche et al. "CE4-related: On Merge Index Coding," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0194, 2018.

Li et al. "CE4-Related: Affine Merge Mode with Prediction Off-sets," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0320, 2018.

Liu et al. "CE9: Simplification of Decoder Side Motion Vector Derivation (Test 9.2.9)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0267, 2018.

Mora et al. "CE3-Related: Decoder-side Intra Mode Derivation," Joint Video Experts Team (JVET) of ITU-T SG 16 WP 3 and ISO/IEC 1/SC 29/WG 11, 12th Meeting: Macao, CN, Oct. 3-12, 2018, document JVET-L0164, 2018.

Rosewarne C et al. "High Efficiency Video Coding (HEVC) Test Model 16 (HM16) Improved Encoder Description Update 7," Joint Collaborative Team on Video Coding (JCT-VC) of ITU-T SG. 16 WP3 and ISO/IEC JTC1/SC29/WG11, 25th Meeting, Chengdu, CN, Oct. 14-21, 2016, document JCTVC-Y1002, 2016.

Su et al. "CE4.4.1: Generalized Bi-Prediction for Intercoding," Joint Video Exploration Team of ISO/IEC JTC 1/SC 29/ WG 11 and ITU-T SG 16, Ljubljana, Jul. 11-18, 2018, document No. JVET-K0248, 2018.

Unno et al. "CE9-Related: DMVR with Coarse-to-Fine Search and Block Size Limit," Joint Video Exploration Team of ISO/IEC JTC 1/SC 29/WG 11 and ITU-T SG 16, KDDI-Research, 12, JVET Meeting, Oct. 3-12, 2018, Macao document JVET-L0382, 2018.

Winken et al. "CE10: Multi-Hypothesis Inter Prediction (Tests 1.5-1.8)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0269, 2018.

Winken et al. "CE10:Multi-Hypothesis Inter Prediction (Tests 1.2.a-1.2.c)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-0148, 2018.

International Search Report and Written Opinion from International Patent Application No. PCT/IB2019/058975 dated Feb. 25, 2020 (22 pages).

International Search Report and Written Opinion from International Patent Application No. PCT/IB2019/058976 dated Feb. 25, 2020 (19 pages).

International Search Report and Written Opinion from International Patent Application No. PCT/IB2019/058978 dated Feb. 25, 2020 (22 pages).

International Search Report and Written Opinion from International Patent Application No. PCT/IB2019/058979 dated Jan. 2, 2020 (16 pages).

International Search Report and Written Opinion from International Patent Application No. PCT/IB2019/058980 dated Jan. 3, 2020 (17 pages).

International Search Report and Written Opinion from International Patent Application No. PCT/IB2019/058981 dated Jan. 20, 2020 (16 pages).

Notice of Allowance from U.S. Appl. No. 17/087,033 dated Oct. 7, 2021.

Notice of Allowance from U.S. Appl. No. 17/086,935 dated Apr. 13, 2021.

Final Office Action from U.S. Appl. No. 17/109,821 dated Jun. 4, 2021.

Chen et al. "Generalized Bi-Prediction for Inter Coding," Joint Video Exploration Team (JVET) of ITU-T SG 16 WP 3 and ISO/IEC JTC 1/SC 29/WG 11, 3rd Meeting: Geneva, CH, May 26-Jun. 1, 2016, document JVET-C0047, 2016.

Non-Final Office Action from U.S. Appl. No. 17/071,489 dated Nov. 27, 2020.

Final Office Action from U.S. Appl. No. 17/071,489 dated Mar. 8, 2021.

Chen et al. "Generalized Bi-Prediction Method for Future Video Coding," 2016 Picture Coding Symposium (PCS), Nuremberg, 2016, pp. 1-5.

Esenlik et al. "Description of Core Experiment 9 (CE9): Decoder Side Motion Vector Derivation," Joint Video Exploration Team (JVET) of ITU-T SG 16 WP 3 and ISO/IEC JTC 1/SC 29/WG 11 10th Meeting: San Diego, US, Apr. 10-20, 2018, document JVET-J1029, 2018.

Chen et al. "Algorithm description for Versatile Video Coding and Test Model 3 (VTM 3)," Joint Video Experts Team (JVET)of ITU-T SG 16 WP 3 and ISO/IEC JTC 1/SC 29/WG 1112th Meeting: Macao, CN, Oct. 3-12, 2018, document JVET-L1002, 2018.

Second Office Action of Chinese Patent Application No. 201980068647.9 dated Apr. 17, 2024.

Notification to Grant Patent Right for Invention from Chinese Patent Application No. 201980068715.1 dated May 23, 2024.

Final Office Action from Chinese Patent Application No. 201980068647.9 dated Jul. 19, 2024.

Chinese Notice of Allowance from Chinese Patent Application No. 201980068720.2 dated Sep. 27, 2024, 8 pages.

Document: JVET-L0591, Xiu, X., et al., "CE9-related: A simplified design of bi-directional optical flow (BIO)," Joint Video Experts Team (JVET) of ITU-T SG 16 WP 3 and ISO/IEC JTC 1/SC 29/WG 11 12th Meeting: Macao, CN, Oct. 3-12, 2018, 9 pages.

Chinese Notice of Allowance from Chinese Patent Application No. 201980068723.6 dated Feb. 8, 2025, 5 pages.

* cited by examiner

Reference block

Current CU

Neighboring samples of current CU

Neighboring samples of the reference block

2000

Current Frame

Interpolated Frame

Reference Frame

L1 reference

L0 reference

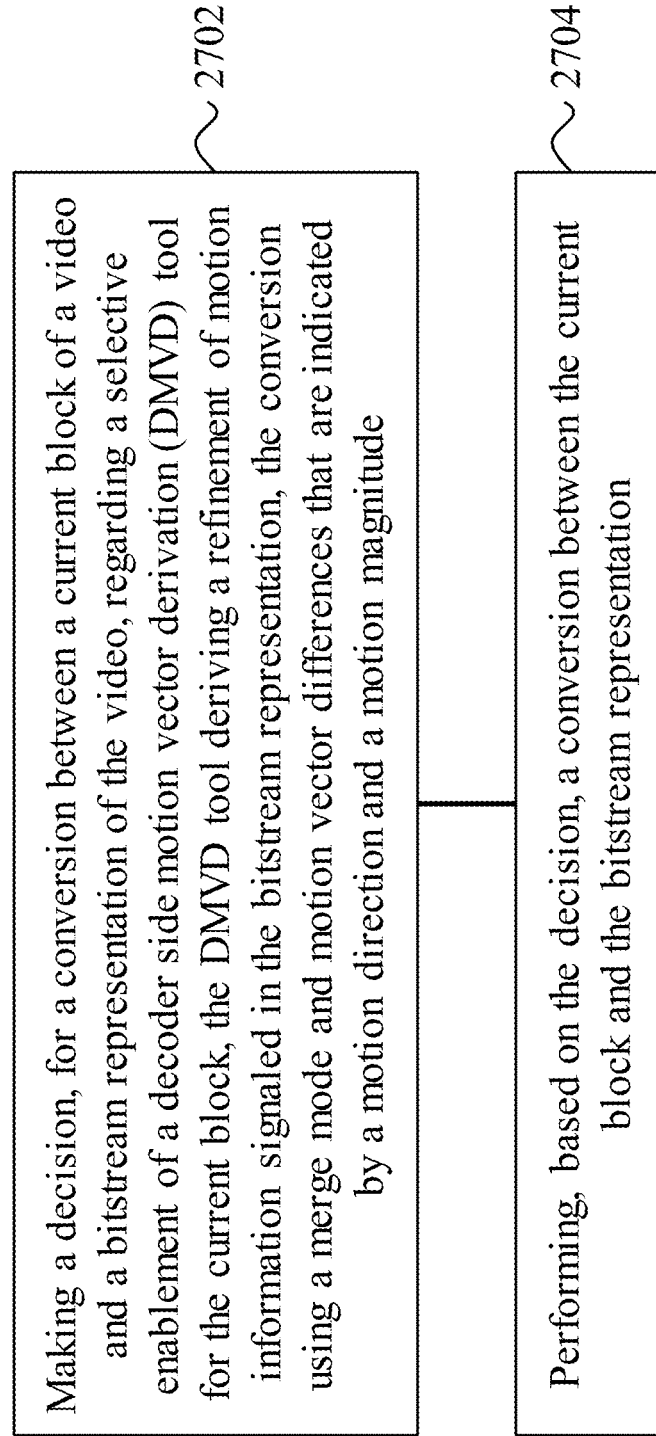

2700

2702

Making a decision, for a conversion between a current block of a video and a bitstream representation of the video, regarding a selective enablement of a decoder side motion vector derivation (DMVD) tool for the current block, the DMVD tool deriving a refinement of motion information signaled in the bitstream representation, the conversion using a merge mode and motion vector differences that are indicated by a motion direction and a motion magnitude

2704

Performing, based on the decision, a conversion between the current block and the bitstream representation

FIG. 27A

RESTRICTIONS ON DECODER SIDE MOTION VECTOR DERIVATION BASED ON CODING INFORMATION

CROSS-REFERENCE TO RELATED APPLICATIONS

This application is a continuation of U.S. application Ser. No. 17/071,489, filed on Oct. 15, 2020, which is a continuation of International Application No. PCT/M2019/058976, filed on Oct. 22, 2019, which claims the priority to and benefits of International Patent Application Nos. PCT/CN2018/111224 and PCT/CN2018/123407, filed on Oct. 22, 2018 and Dec. 25, 2018, respectively. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to restrictions on decoder-side motion vector derivation based on coding information are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes making a decision, for a conversion between a current block of a video and a bitstream representation of the video, regarding a selective enablement of a decoder side motion vector derivation (DMVD) tool for the current block, wherein the DMVD tool derives a refinement of motion information signaled in the bitstream representation, and wherein the conversion uses a merge mode and motion vector differences that are indicated by a motion direction and a motion magnitude; and performing, based on the decision, a conversion between the current block and the bitstream representation.

In another representative aspect, the disclosed technology may be used to provide a method for video processing. This method includes making a decision, based on decoded motion information associated with a current block of a video, regarding a selective enablement of a decoder side motion vector derivation (DMVD) tool for the current block, wherein the DMVD tool derives a refinement of motion information signaled in a bitstream representation of the video; and performing, based on the decision, a conversion between the current block and the bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 27A and 27B show flowcharts of example methods for video processing.

DETAILED DESCRIPTION

Figure 1:
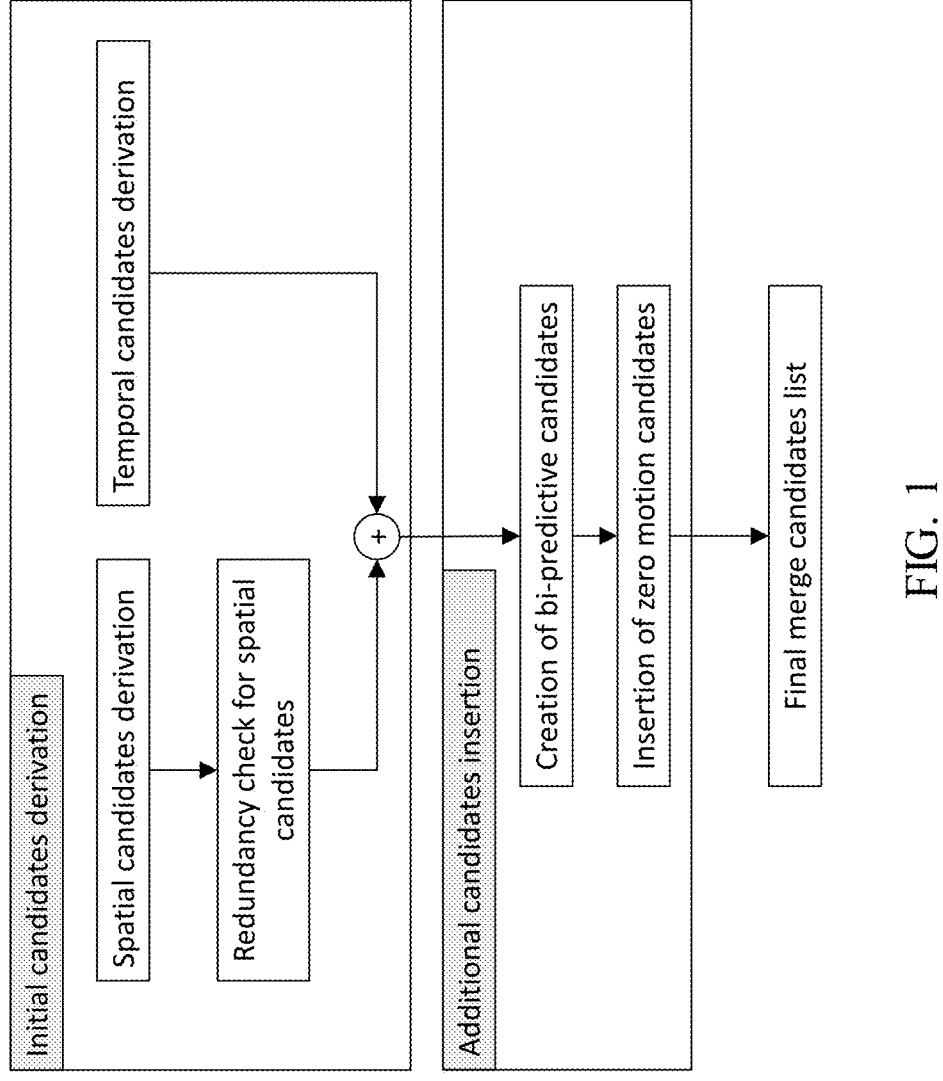
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation

Step 1.1: Spatial candidates derivation

Step 1.2: Redundancy check for spatial candidates

Step 1.3: Temporal candidates derivation

Step 2: Additional candidates insertion

Step 2.1: Creation of bi-predictive candidates

Step 2.2: Insertion of zero motion candidates

FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
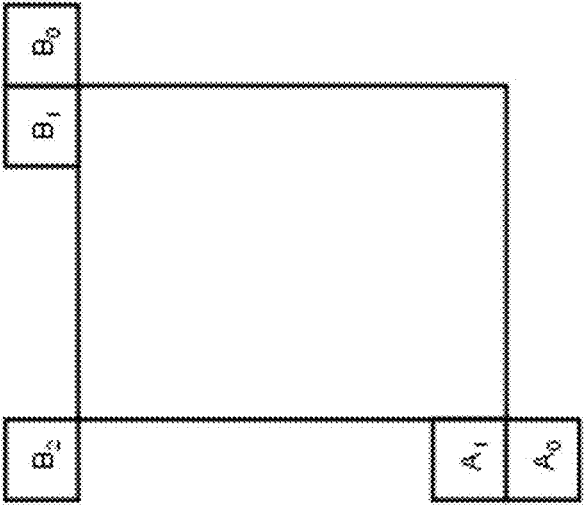
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
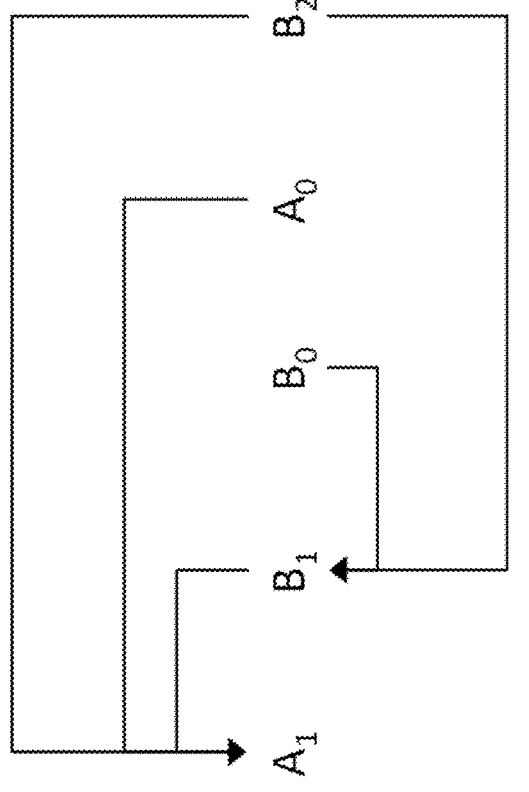
FIG. 3 shows an example of candidate pairs subject to a redundancy check of spatial merge candidates.
Figure 4A:
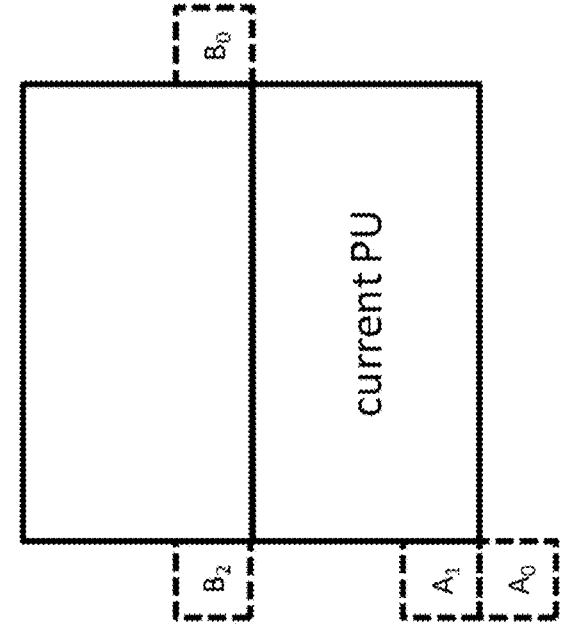
FIGS. 4A and 4B show examples of the position of a second prediction unit (PU) based on the size and shape of the current block.
Figure 4B:
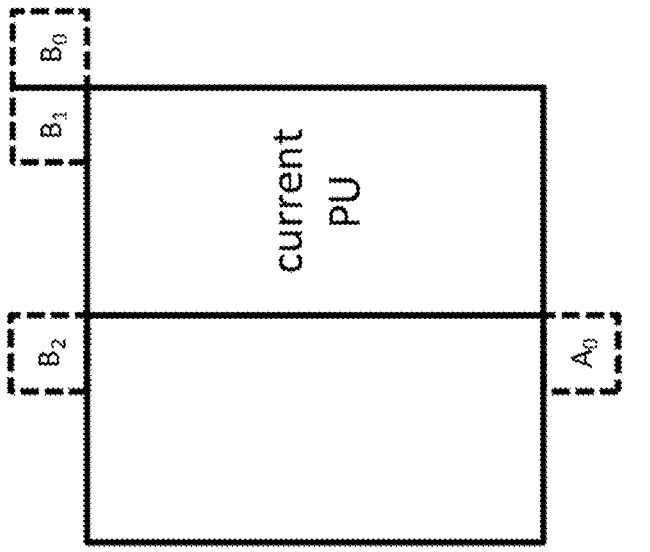

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
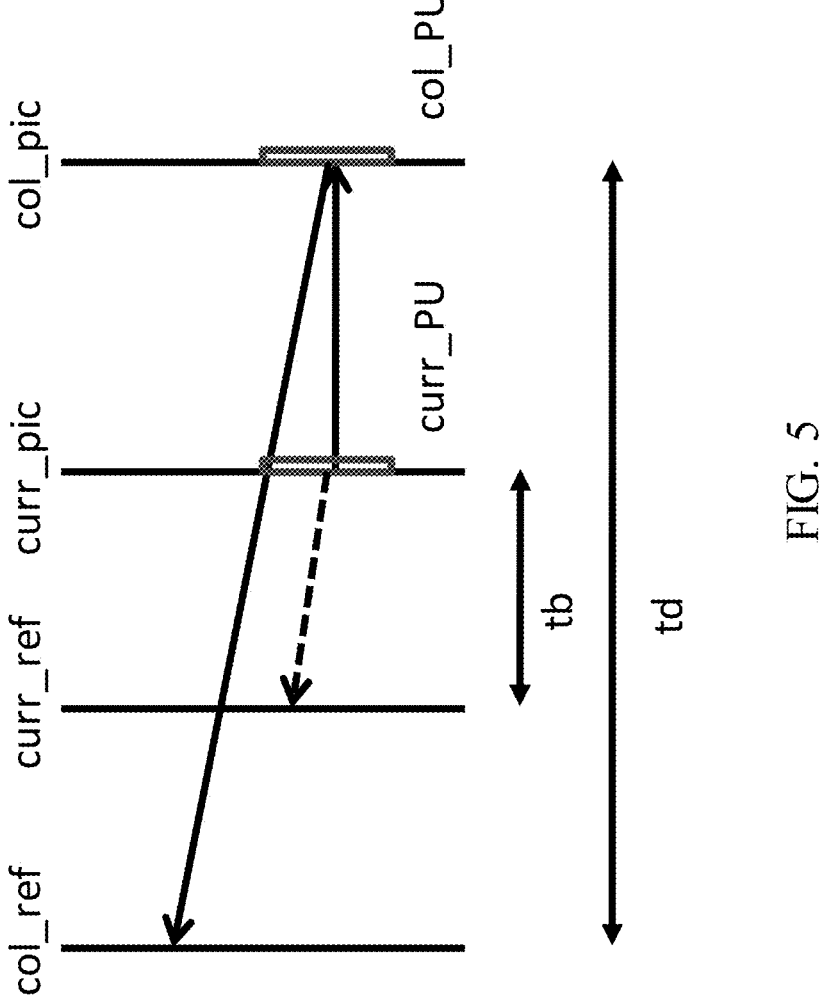
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
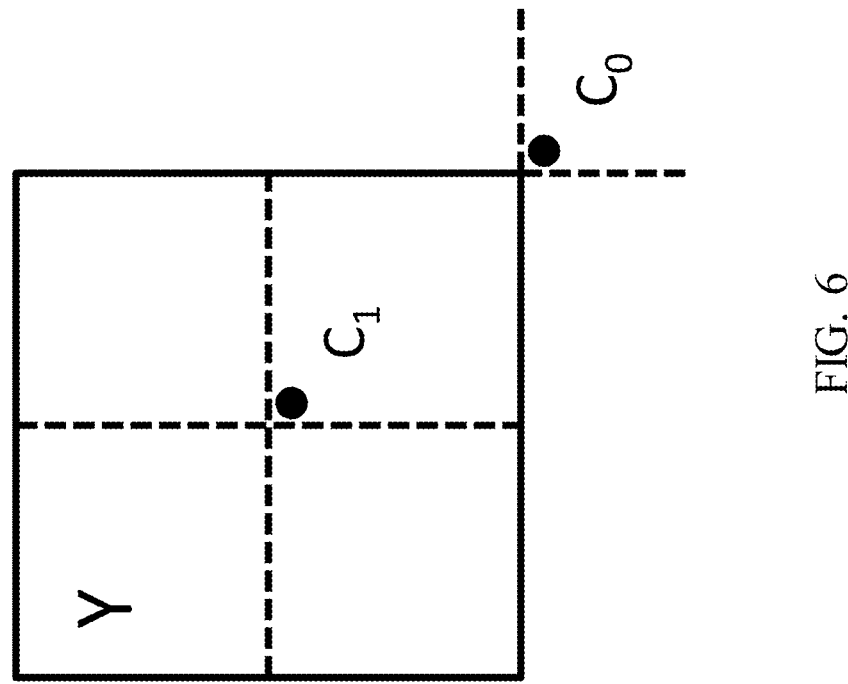
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
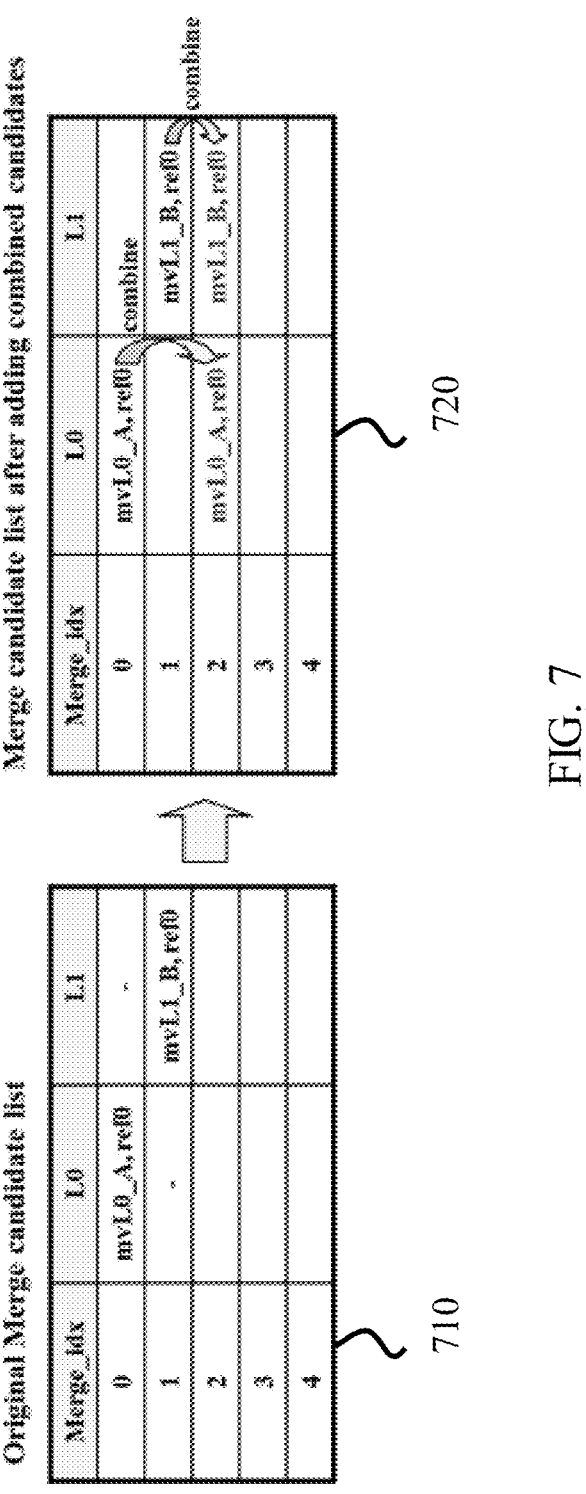
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
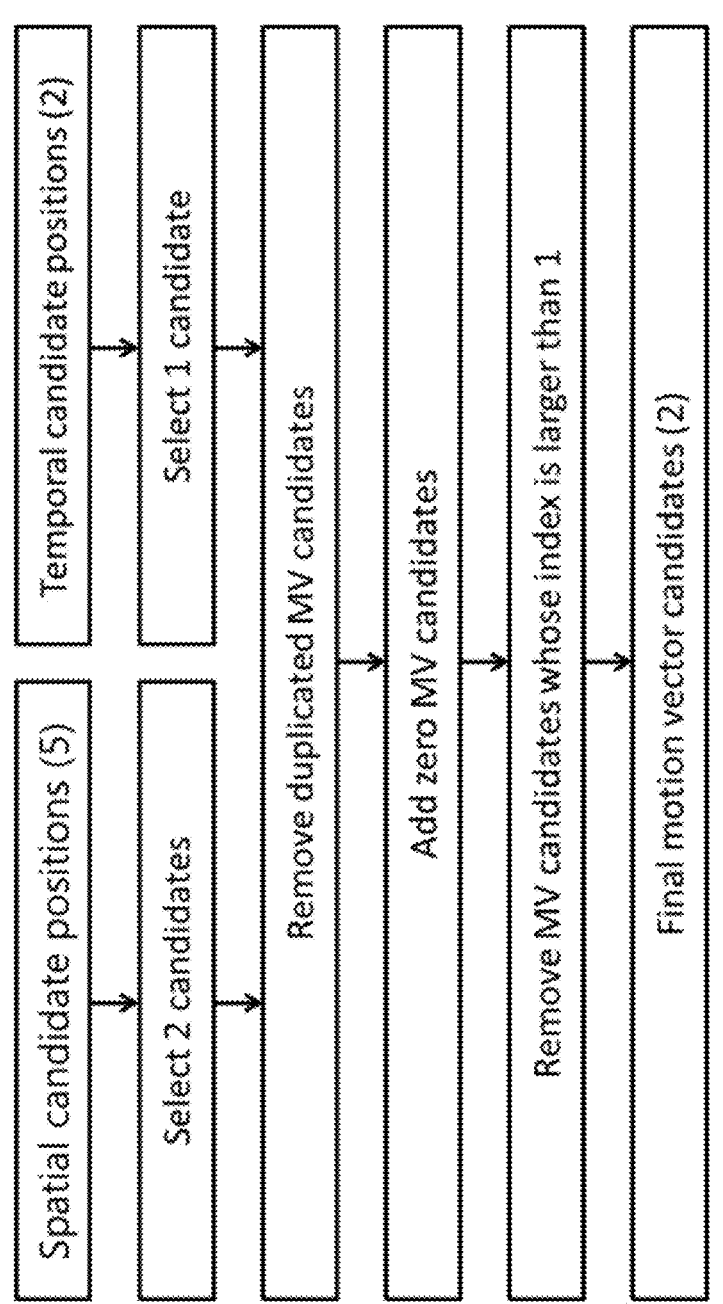
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No Spatial Scaling (1) Same reference picture list, and same reference picture index (same POC)

(2) Different reference picture list, but same reference picture (same POC)

Spatial Scaling (3) Same reference picture list, but different reference picture (different POC)

(4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
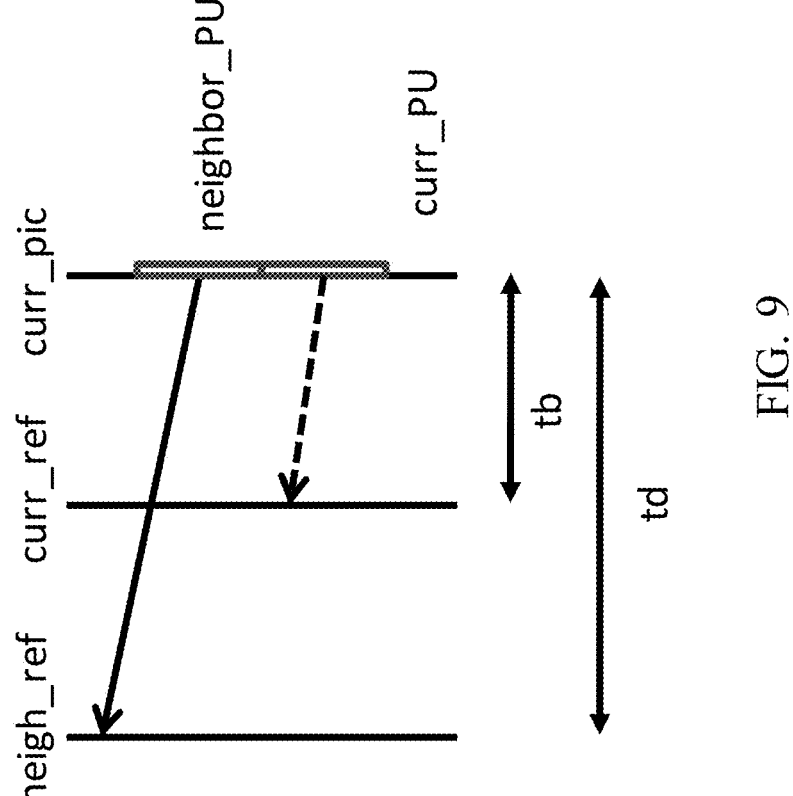
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
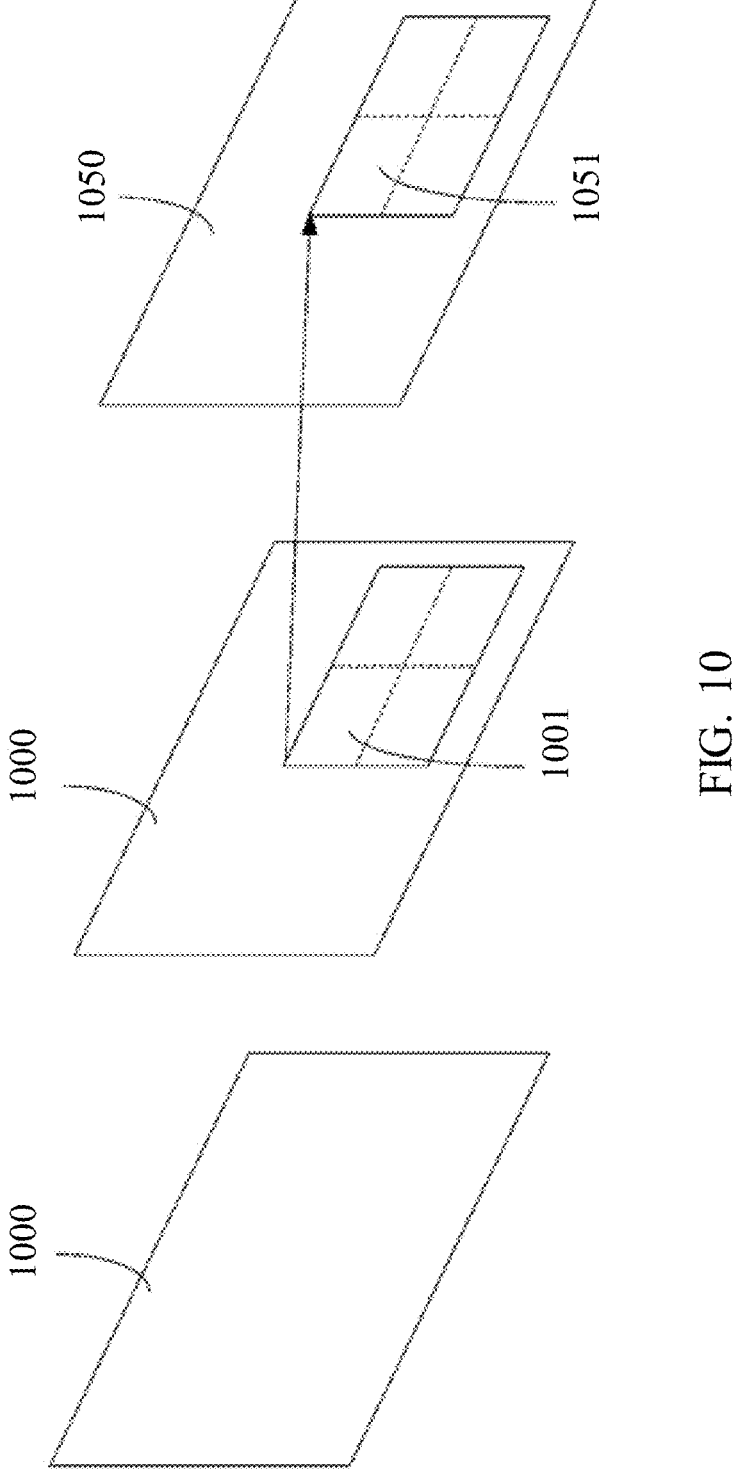
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1–X) for each sub-CU.

2.1.2 Examples of Spatial-Temporal Motion Vector Prediction (STMVP)

Figure 11:
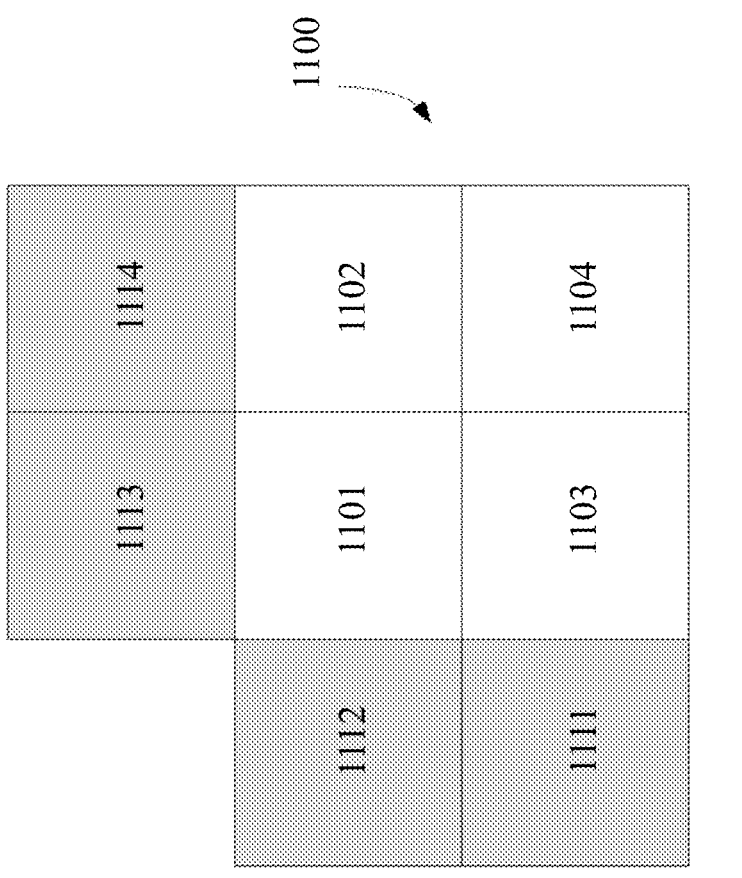
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 12A and 12B.

Figure 12A:
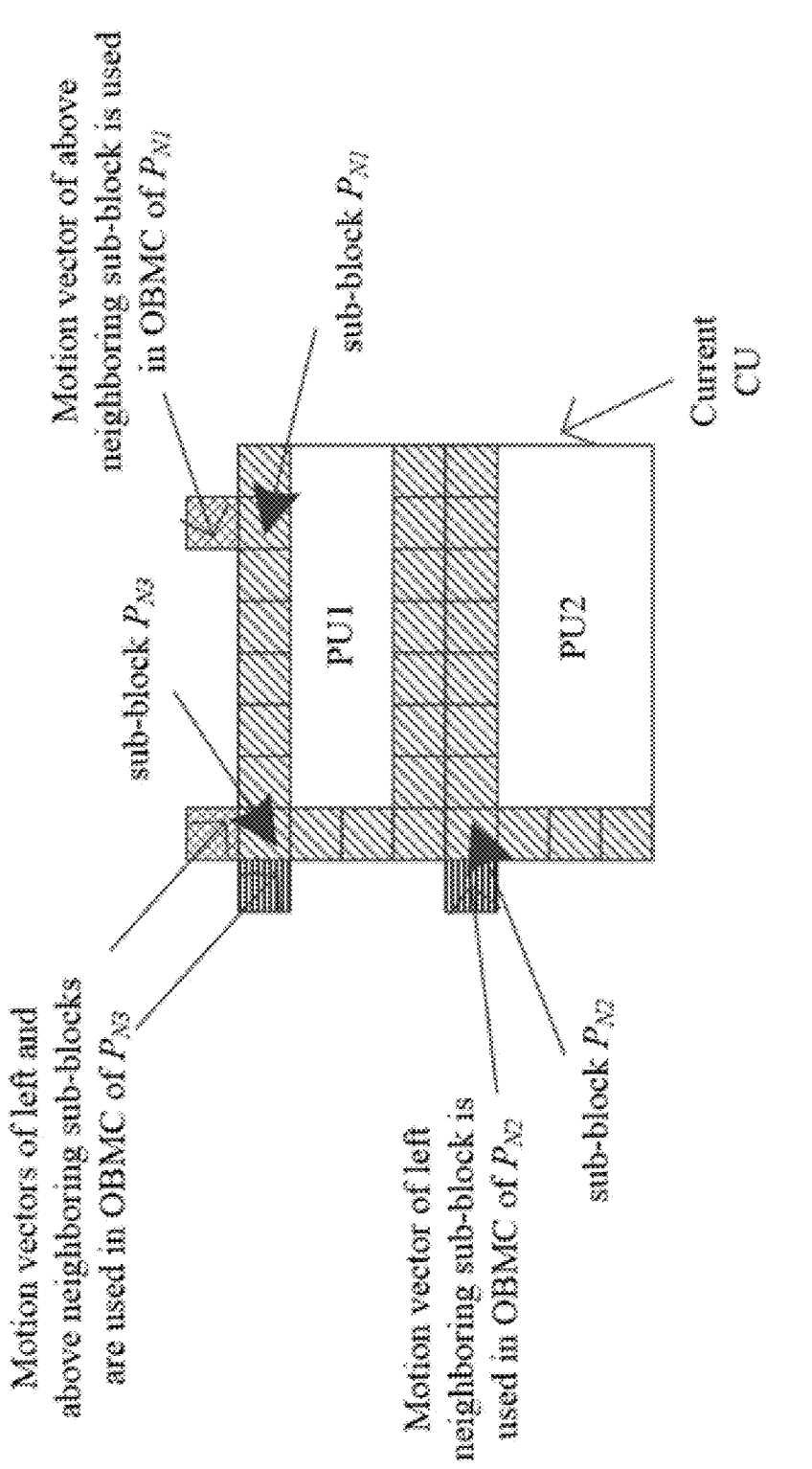
FIGS. 12A and 12B show example snapshots of sub-block when using the overlapped block motion compensation (OBMC) algorithm.
Figure 12B:
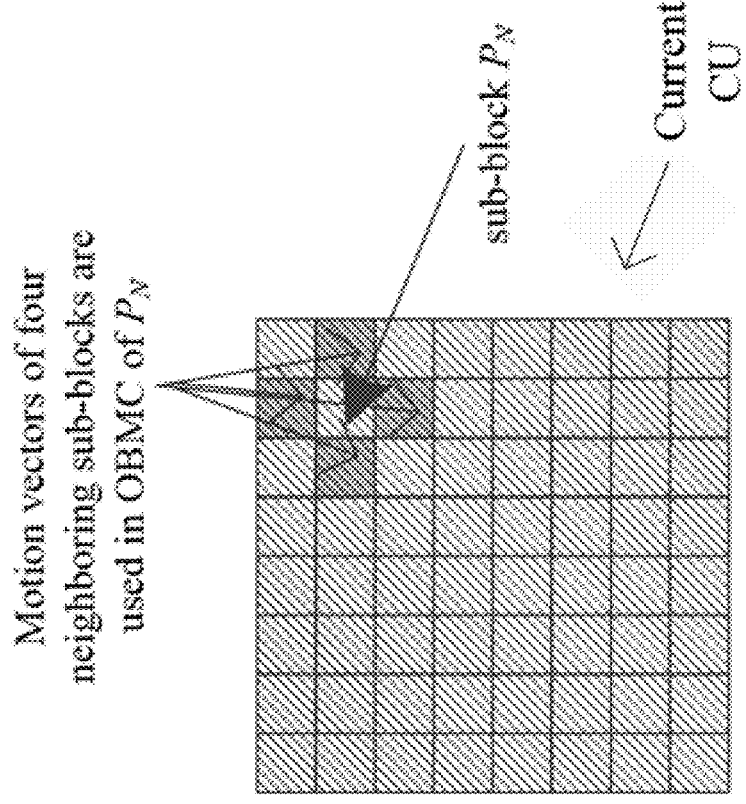

FIG. 12A shows sub-blocks at the CU/PU boundary, and the hatched sub-blocks are where OBMC applies. Similarly, FIG. 12B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {1/4, 1/8, 1/16, 1/32} are used for PN and the weighting factors {3/4, 7/8, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {1/4, 1/8} are used for PN and weighting factors {3/4, 7/8} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Local Illumination Compensation (LIC)

LIC is based on a linear model for illumination changes, using a scaling factor a and an offset b. And it is enabled or disabled adaptively for each inter-mode coded coding unit (CU).

Figure 13:
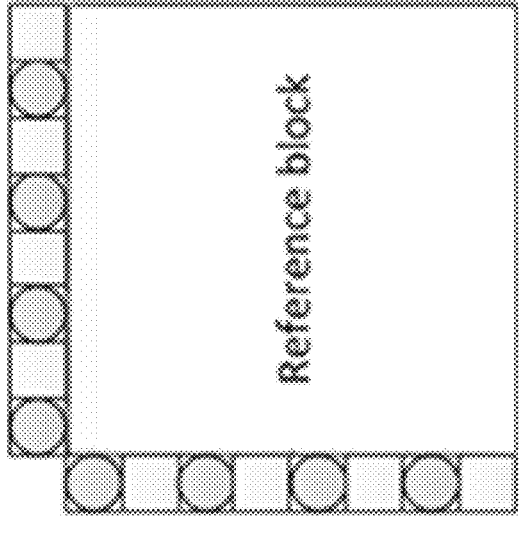
FIG. 13 shows an example of neighboring samples used to derive parameters for the local illumination compensation (LIC) algorithm.
Figure 13:
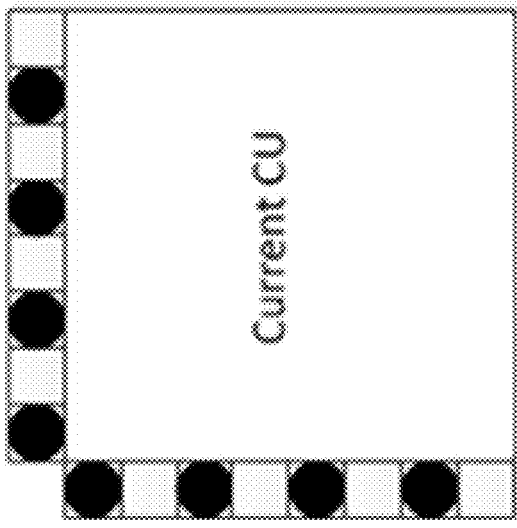
Figure 13:
Figure 13:
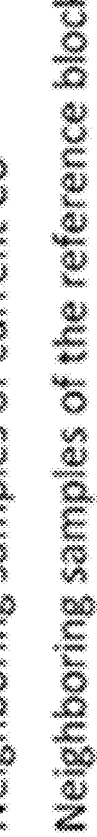

When LIC applies for a CU, a least square error method is employed to derive the parameters a and b by using the neighboring samples of the current CU and their corresponding reference samples. FIG. 13 shows an example of neighboring samples used to derive parameters of the IC algorithm. Specifically, and as shown in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Examples of Affine Motion Compensation Prediction

Figure 14:
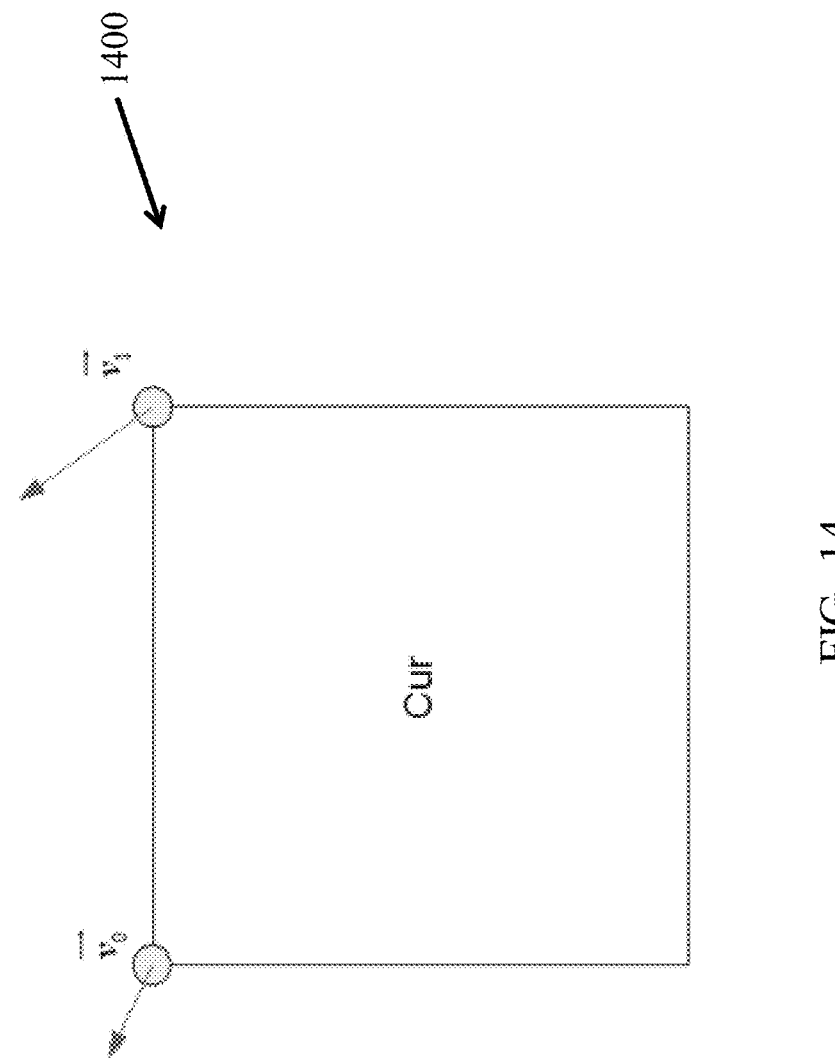
FIG. 14 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 14 shows an example of an affine motion field of a block 1400 described by two control point motion vectors Vo and Vi. The motion vector field (MVF) of the block 1400 can be described by the following equation:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \qquad \text{Eq. (1)}$$

As shown in FIG. 14, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \dfrac{w \times MvPre}{\max(abs(v_{1x} - v_{0x}), abs(v_{1y} - v_{0y}))}\right) \\ N = clip3\left(4, h, \dfrac{h \times MvPre}{\max(abs(v_{2x} - v_{0x}), abs(v_{2y} - v_{0y}))}\right) \end{cases} \qquad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 15:
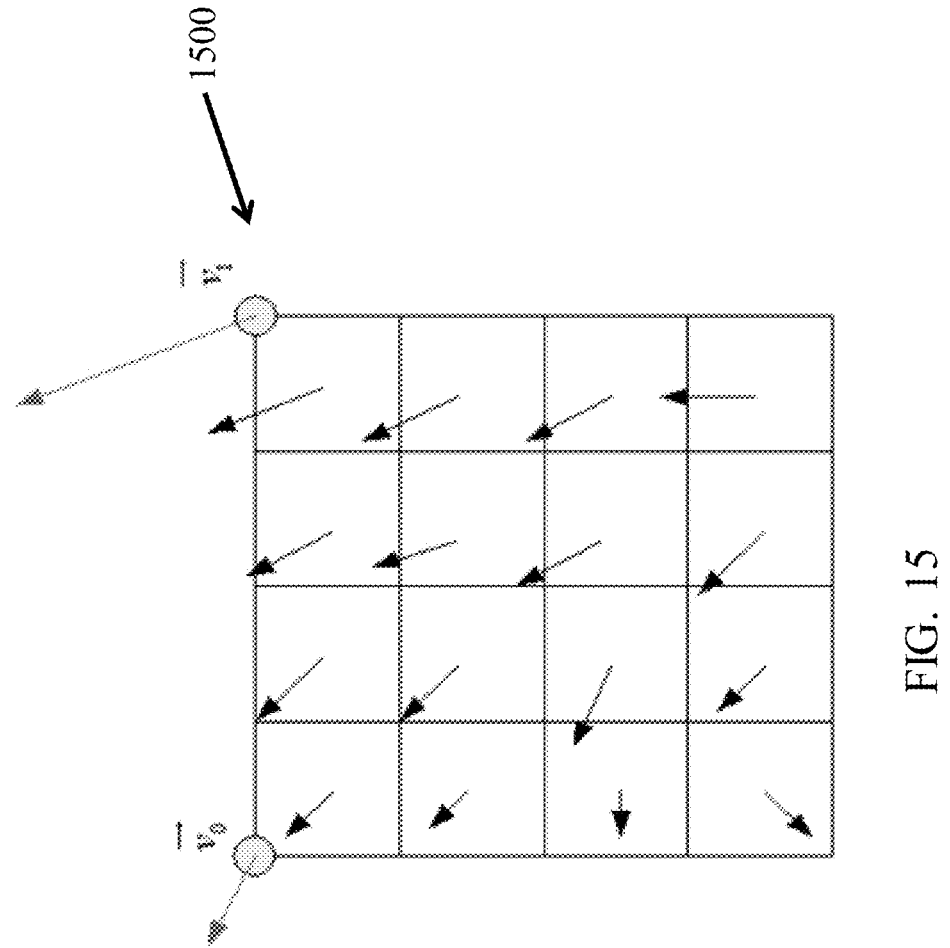
FIG. 15 shows an example of an affine motion vector field (MVF) per sub-block.

FIG. 15 shows an example of affine MVF per sub-block for a block 1500. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.6.1 Embodiments of the AF_INTER Mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1) | v_0 = \{v_A, v_B, v_C\}, v_1 = \{v_D, v_E\}\}$ is constructed using the neighboring blocks.

Figure 16:
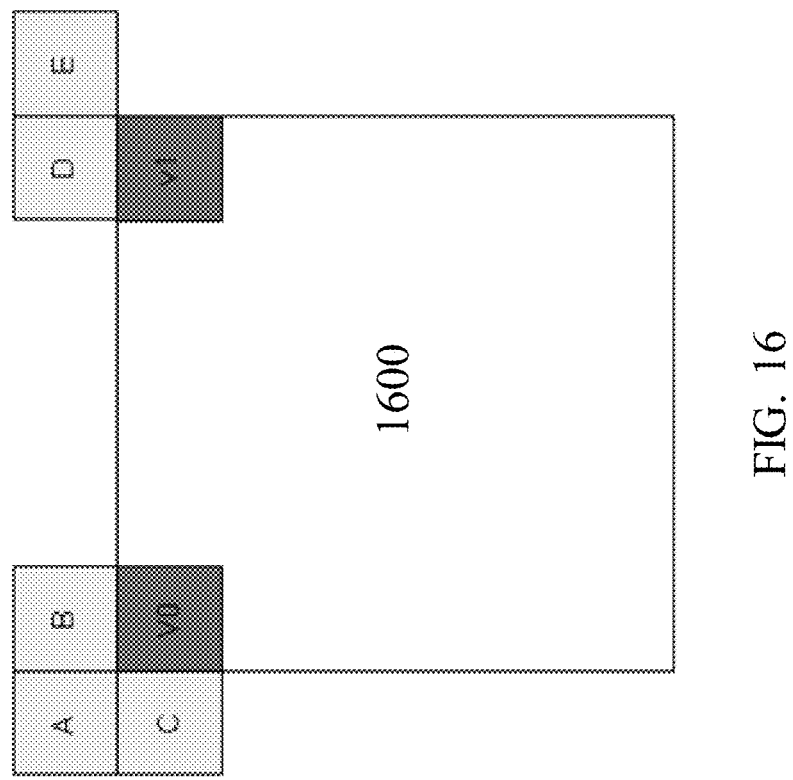
FIG. 16 shows an example of motion vector prediction (MVP) for the AF_INTER affine motion mode.

FIG. 16 shows an example of motion vector prediction (MVP) for a block 1600 in the AF_INTER mode. As shown in FIG. 16, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

2.6.3 Embodiments of the AF_MERGE Mode

Figure 17B:
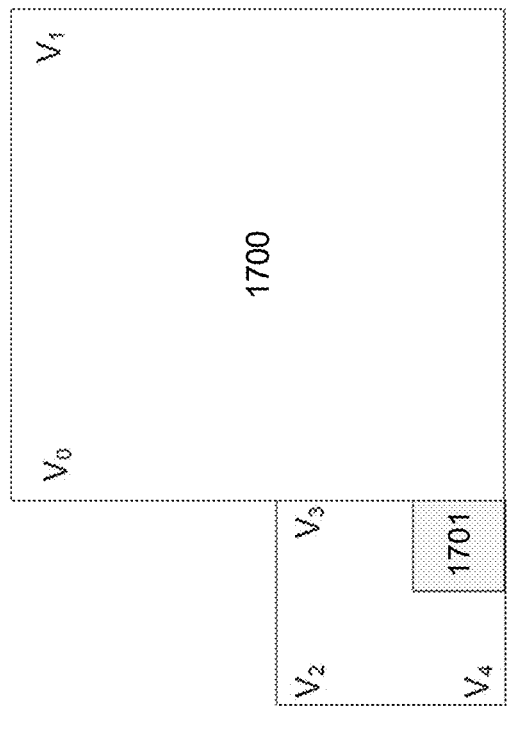
FIGS. 17A and 17B show example candidates for the AF_MERGE affine motion mode.
Figure 17A:
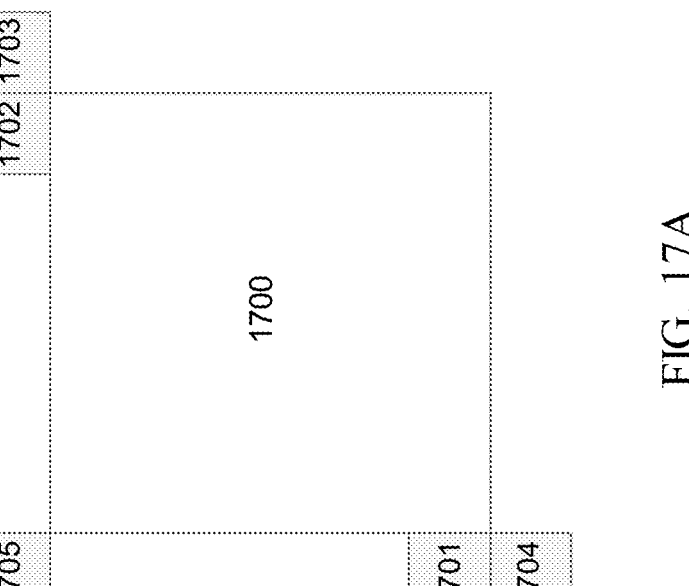

When a CU is applied in AF_MERGE mode, it gets the first block coded with an affine mode from the valid neighboring reconstructed blocks. FIG. 17A shows an example of the selection order of candidate blocks for a current CU 1700. As shown in FIG. 17A, the selection order can be from left (1701), above (1702), above right (1703), left bottom (1704) to above left (1705) of the current CU 1700. FIG. 17B shows another example of candidate blocks for a current CU 1700 in the AF_MERGE mode. If the neighboring left bottom block 1801 is coded in affine mode, as shown in FIG. 17B, the motion vectors $v_2$, $v_3$ and $v_4$ of the top left corner, above right corner, and left bottom corner of the CU containing the sub-block 1701 are derived. The motion vector $v_0$ of the top left corner on the current CU 1700 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.7 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad \text{Eq. (3)}$$

Figure 18:
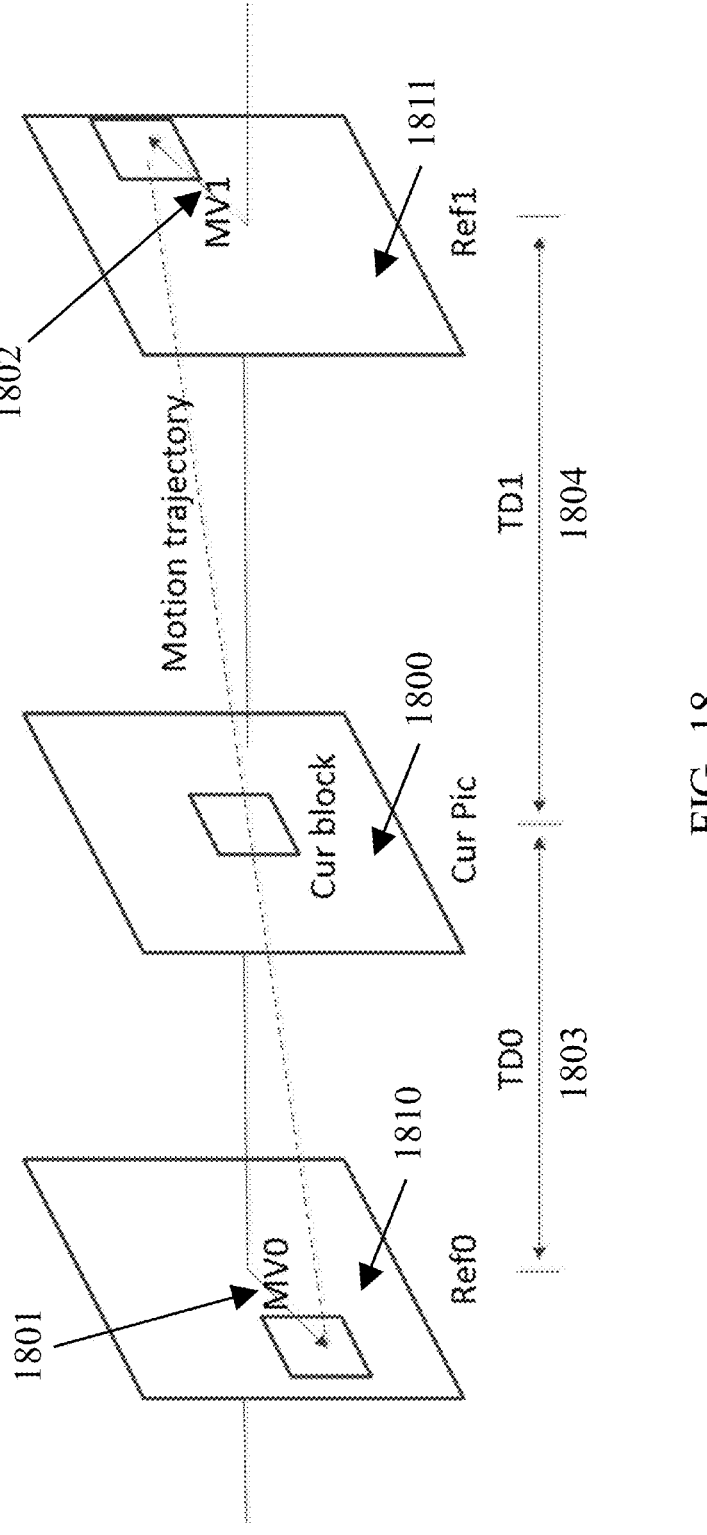
FIG. 18 shows an example of bilateral matching in pattern matched motion vector derivation (PMMVD) mode, which is a special merge mode based on the frame-rate up conversion (FRUC) algorithm.

FIG. 18 shows an example of bilateral matching used in the Frame-Rate Up Conversion (FRUC) method. The bilateral matching is used to derive motion information of the current CU by finding the closest match between two blocks along the motion trajectory of the current CU (1800) in two different reference pictures (1810, 1811). Under the assumption of continuous motion trajectory, the motion vectors MV0 (1801) and MV1 (1802) pointing to the two reference blocks are proportional to the temporal distances, e.g., TD0 (1803) and TD1 (1804), between the current picture and the two reference pictures. In some embodiments, when the current picture 1800 is temporally between the two reference pictures (1810, 1811) and the temporal distance from the current picture to the two reference pictures is the same, the bilateral matching becomes mirror based bi-directional MV.

Figure 19:
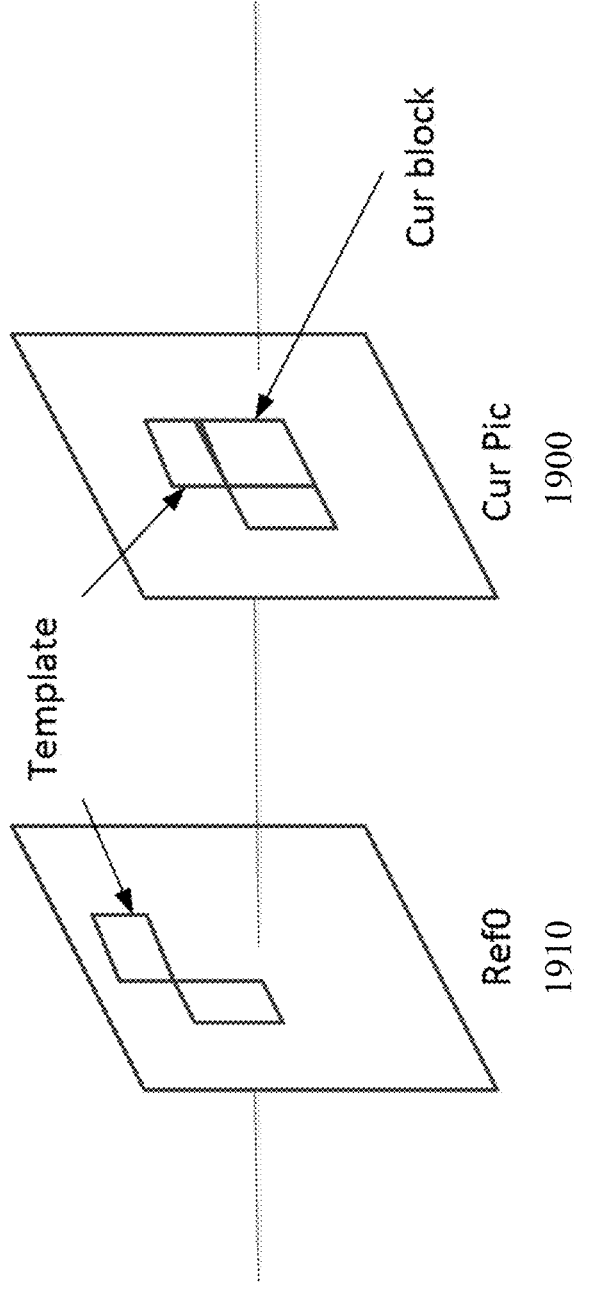
FIG. 19 shows an example of template matching in the FRUC algorithm.

FIG. 19 shows an example of template matching used in the Frame-Rate Up Conversion (FRUC) method. Template matching can be used to derive motion information of the current CU 1900 by finding the closest match between a template (e.g., top and/or left neighboring blocks of the current CU) in the current picture and a block (e.g., same size to the template) in a reference picture 1910. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 20:
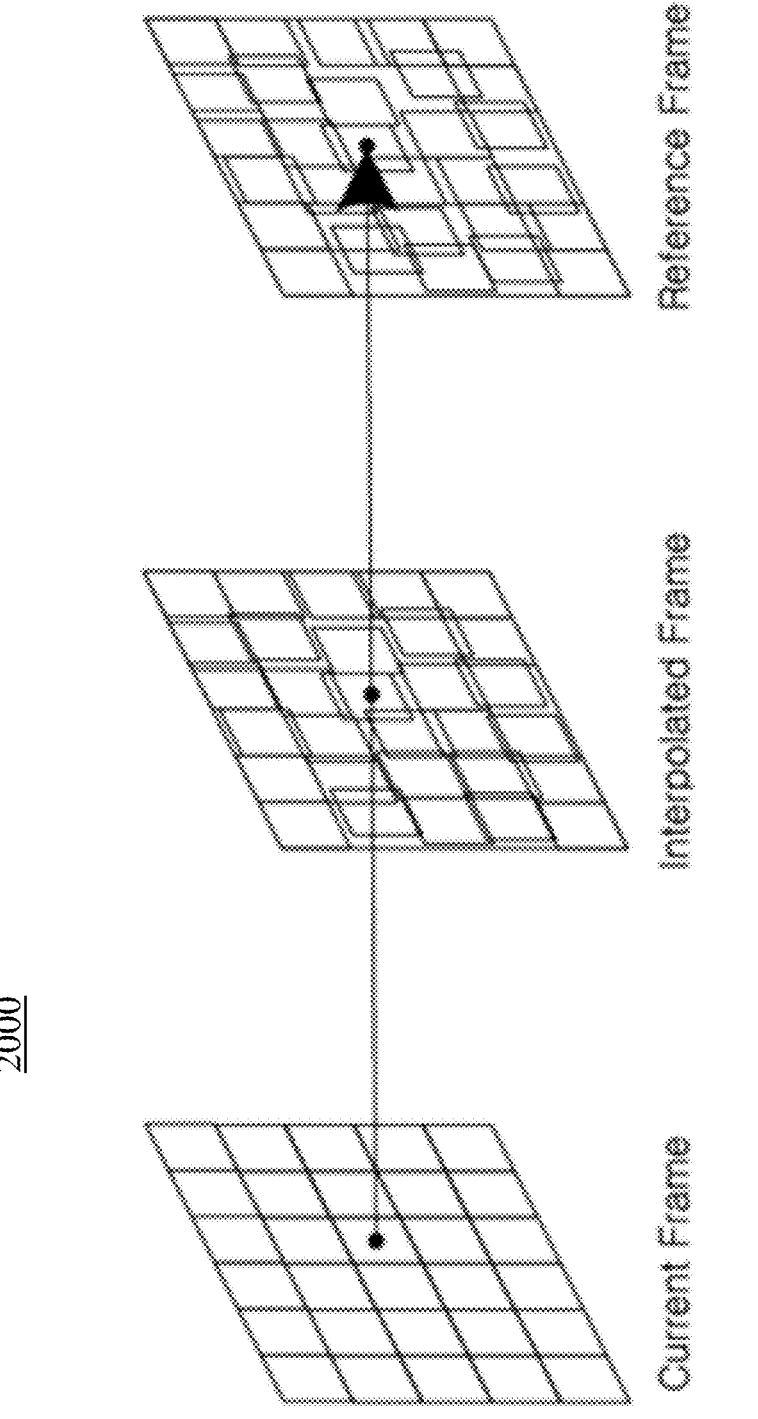
FIG. 20 shows an example of unilateral motion estimation in the FRUC algorithm.
Figure 21:
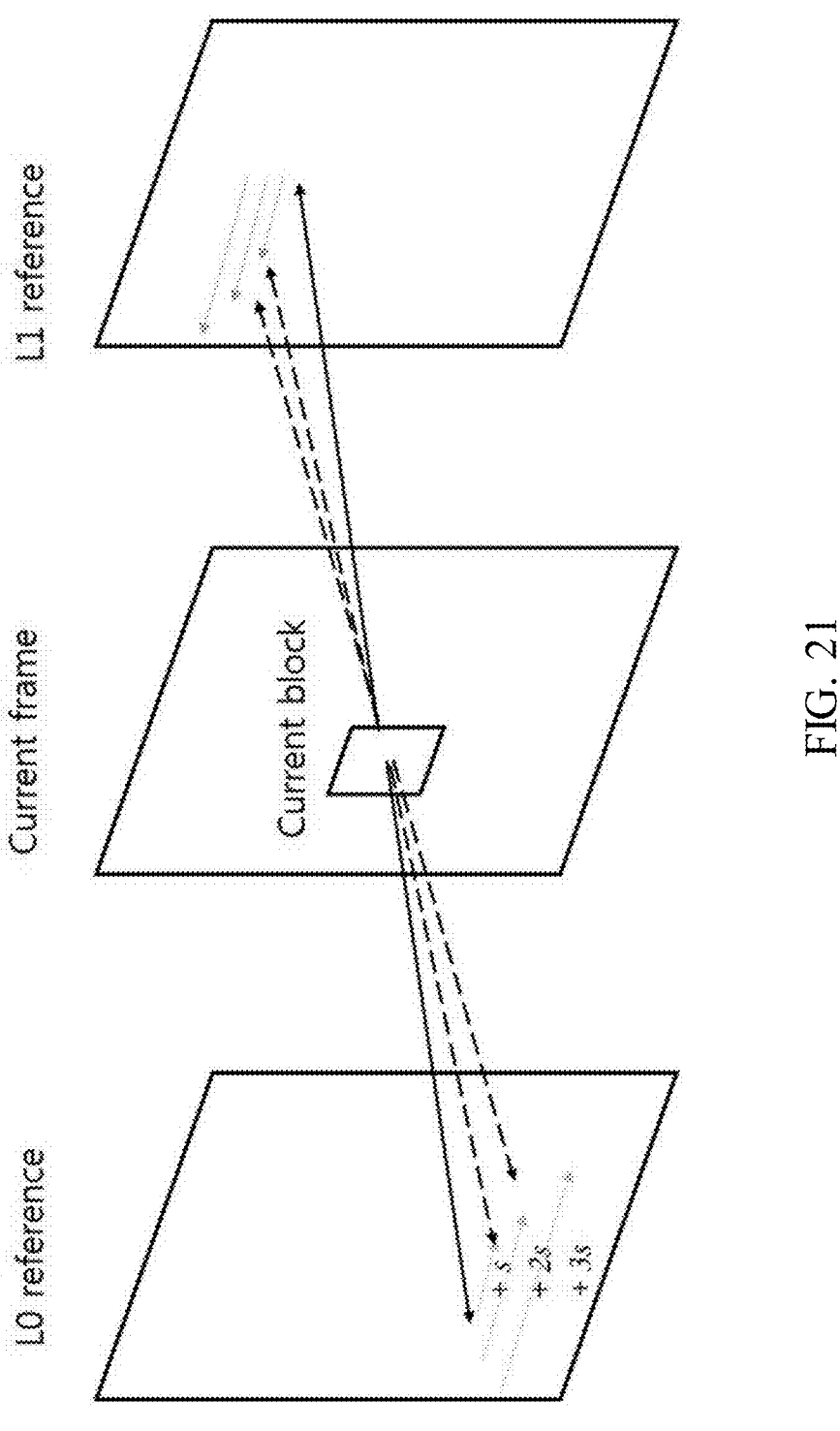
FIG. 21 shows an example of an ultimate motion vector expression (UMVE) search process for a current frame.
Figures 22A, 22B:
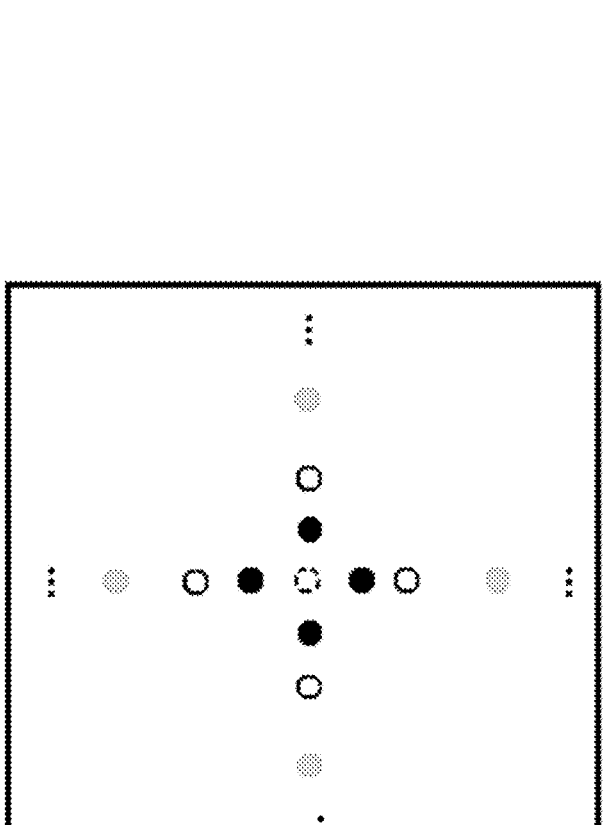
FIGS. 22A and 22B show examples of UMVE search points.

In some embodiments, the motion field of each reference pictures in both reference lists is traversed at 4×4 block level. FIG. 20 shows an example of unilateral Motion Estimation (ME) 2000 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \qquad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
```

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.8 Examples of Generalized Bi-Prediction (GBI)

In conventional bi-prediction, the predictors from L0 and L1 are averaged to generate the final predictor using the equal weight 0.5. The predictor generation formula is shown as in Equation (5).

$$P_{TraditionalBiPred} = (P_{L0} + P_{L1} + \text{RoundingOffset}) >> \text{shiftNum} \qquad \text{Eq. (5)}$$

In Equation (5) $P_{TraditionalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized bi-prediction (GBI) proposes to allow applying different weights to predictors from L0 and L1. The predictor generation is shown in Equation (6).

$$P_{GBi} = (1 - w_1) * P_{L0} + w_1 * P_{L1} + \text{RoundingOffset}_{GBi}) >> \text{shiftNum}_{GBi}, \qquad \text{Eq. (6)}$$

In Equation (6), $P_{GBi}$ is the final predictor of GBi. $(1 - w_1)$ and $w_1$ are the selected GBI weights applied to the predictors of L0 and L1, respectively. RoundingOffset$_{GBi}$ and shiftNum$_{BBi}$ are used to normalize the final predictor in GBi.

The supported weights of $w_1$ is $\{-1/4, 3/8, 1/2, 5/8, 5/4\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports DMVR to generate the weighted average of template as well as the final predictor for BMS-1.0.

2.9 Examples of Multi-Hypothesis Inter Prediction

In the multi-hypothesis inter prediction mode, one or more additional prediction signals are signaled, in addition to the conventional uni/bi prediction signal. The resulting overall prediction signal is obtained by sample-wise weighted superposition. With the uni/bi prediction signal $p_{uni/bi}$ and the first additional inter prediction signal/hypothesis $h_3$, the resulting prediction signal $p_3$ is obtained as follows:

$$p_3 = (1 - \alpha)p_{uni/bi} + \alpha h_3$$

The changes to the prediction unit syntax structure are shown below:

| prediction_unit( x0, y0, nPbW, nPbH ) {                     | Descriptor |
|-------------------------------------------------------------|------------|
| ...                                                         |            |
|   if( ! cu_skip_flag[ x0 ][ y0 ] ) {             |            |
|     i = 0                               |            |
|     readMore = 1                       |            |
|     while( i < MaxNumAdditionalHypotheses && readMore ) { |  |
|       additional_hypothesis_flag[ x0 ][ y0 ][ i ] | ae(v) |
|       if( additional_hypothesis_flag[ x0 ][ y0 ][ i ] { |  |
|         ref_idx_add_hyp[ x0 ][ y0 ][ i ] | ae(v) |
|         mvd_coding( x0, y0, 2+i ) |  |
|         mvp_add_hyp_flag[ x0 ][ y0 ][ i ] | ae(v) |
|         add_hyp_weight_idx[ x0 ][ y0 ][ i ] | ae(v) |
|       }                       |            |
|       readMore = additional_hypothesis_flag[ x0 ][ y0 ][ i ] |  |
|       i++                     |            |
|     }                                   |            |
|   }                                               |            |
| }                                                           |            |

The weighting factor a is specified by the syntax element add_hyp_weight_idx, according to the following mapping:

| add_hyp_weight_idx | $\alpha$ |
|--------------------|----------|
| 0                  | 1/4      |
| 1                  | −1/8     |

In some embodiments, and for the additional prediction signals, the concept of prediction list0/list1 is abolished, and instead one combined list is used. This combined list is generated by alternatingly inserting reference frames from list0 and list1 with increasing reference index, omitting reference frames which have already been inserted, such that double entries are avoided.

In some embodiments, and analogously to the above, more than one additional prediction signals can be used. The resulting overall prediction signal is accumulated iteratively with each additional prediction signal.

$$p_{n+1}=(1-\alpha_{n+1})p_n+\alpha_{n+1}h_{n+1}$$

The resulting overall prediction signal is obtained as the last $p_n$ (i.e., the $p_n$ having the largest index n).

Note that also for inter prediction blocks using MERGE mode (but not SKIP mode), additional inter prediction signals can be specified. Further note, that in case of MERGE, not only the uni/bi prediction parameters, but also the additional prediction parameters of the selected merging candidate can be used for the current block.

2.10 Examples of Multi-Hypothesis Prediction for Uni-Prediction of AMVP Mode

In some embodiments, when the multi-hypothesis prediction is applied to improve uni-prediction of AMVP mode, one flag is signaled to enable or disable multi-hypothesis prediction for inter_dir equal to 1 or 2, where 1, 2, and 3 represent list 0, list 1, and bi-prediction, respectively. Moreover, one more merge index is signaled when the flag is true. In this way, multi-hypothesis prediction turns uni-prediction into bi-prediction, where one motion is acquired using the original syntax elements in AMVP mode while the other is acquired using the merge scheme. The final prediction uses 1:1 weights to combine these two predictions as in bi-prediction. The merge candidate list is first derived from merge mode with sub-CU candidates (e.g., affine, alternative temporal motion vector prediction (ATMVP)) excluded.

Next, it is separated into two individual lists, one for list 0 (L0) containing all L0 motions from the candidates, and the other for list 1 (L1) containing all L1 motions. After removing redundancy and filling vacancy, two merge lists are generated for L0 and L1 respectively. There are two constraints when applying multi-hypothesis prediction for improving AMVP mode. First, it is enabled for those CUs with the luma coding block (CB) area larger than or equal to 64. Second, it is only applied to L1 when in low delay B pictures.

2.11 Examples of Multi-Hypothesis Prediction for Skip/Merge Mode

In some embodiments, when the multi-hypothesis prediction is applied to skip or merge mode, whether to enable multi-hypothesis prediction is explicitly signaled. An extra merge indexed prediction is selected in addition to the original one. Therefore, each candidate of multi-hypothesis prediction implies a pair of merge candidates, containing one for the $1^{st}$ merge indexed prediction and the other for the $2^{nd}$ merge indexed prediction. However, in each pair, the merge candidate for the $2^{nd}$ merge indexed prediction is implicitly derived as the succeeding merge candidate (i.e., the already signaled merge index plus one) without signaling any additional merge index. After removing redundancy by excluding those pairs, containing similar merge candidates and filling vacancy, the candidate list for multi-hypothesis prediction is formed. Then, motions from a pair of two merge candidates are acquired to generate the final prediction, where 5:3 weights are applied to the $1^{st}$ and $2^{nd}$ merge indexed predictions, respectively. Moreover, a merge or skip CU with multi-hypothesis prediction enabled can save the motion information of the additional hypotheses for reference of the following neighboring CUs in addition to the motion information of the existing hypotheses.

Note that sub-CU candidates (e.g., affine, ATMVP) are excluded from the candidate list, and for low delay B pictures, multi-hypothesis prediction is not applied to skip mode. Moreover, when multi-hypothesis prediction is applied to merge or skip mode, for those CUs with CU width or CU height less than 16, or those CUs with both CU width and CU height equal to 16, bi-linear interpolation filter is used in motion compensation for multiple hypotheses. Therefore, the worst-case bandwidth (required access samples per sample) for each merge or skip CU with multi-hypothesis prediction enabled is less than half of the worst-case bandwidth for each 4×4 CU with multi-hypothesis prediction disabled.

2.12 Examples of Ultimate Motion Vector Expression (UMVE)

In some embodiments, ultimate motion vector expression (UMVE), which is also referred to as merge with MVD (MMVD), is presented. The UMVE mode is used for either skip or merge modes with a proposed motion vector expression method.

UMVE re-uses merge candidate as same as using in VVC. Among the merge candidates, a candidate can be selected, and is further expanded by the proposed motion vector expression method.

UMVE provides a new motion vector expression with simplified signaling. The expression method includes starting point, motion magnitude, and motion direction. This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

| Base candidate IDX | 0 | 1 | 2 | 3 |
|---|---|---|---|---|
| N$^{th}$ MVP | 1$^{st}$ MVP | 2$^{nd}$ MVP | 3$^{rd}$ MVP | 4$^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below:

| Direction IDX | 00 | 01 | 10 | 11 |
|---|---|---|---|---|
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.13 Examples of Affine Merge Mode with Prediction Offsets

In some embodiments, UMVE is extended to affine merge mode, we will call this UMVE affine mode thereafter. The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

A distance offset table with size of 5 is used as shown in the table below.

| Distance IDX | 0 | 1 | 2 | 3 | 4 |
|---|---|---|---|---|---|
| Distance-offset | ½-pel | 1-pel | 2-pel | 4-pel | 8-pel |

Figure 23:
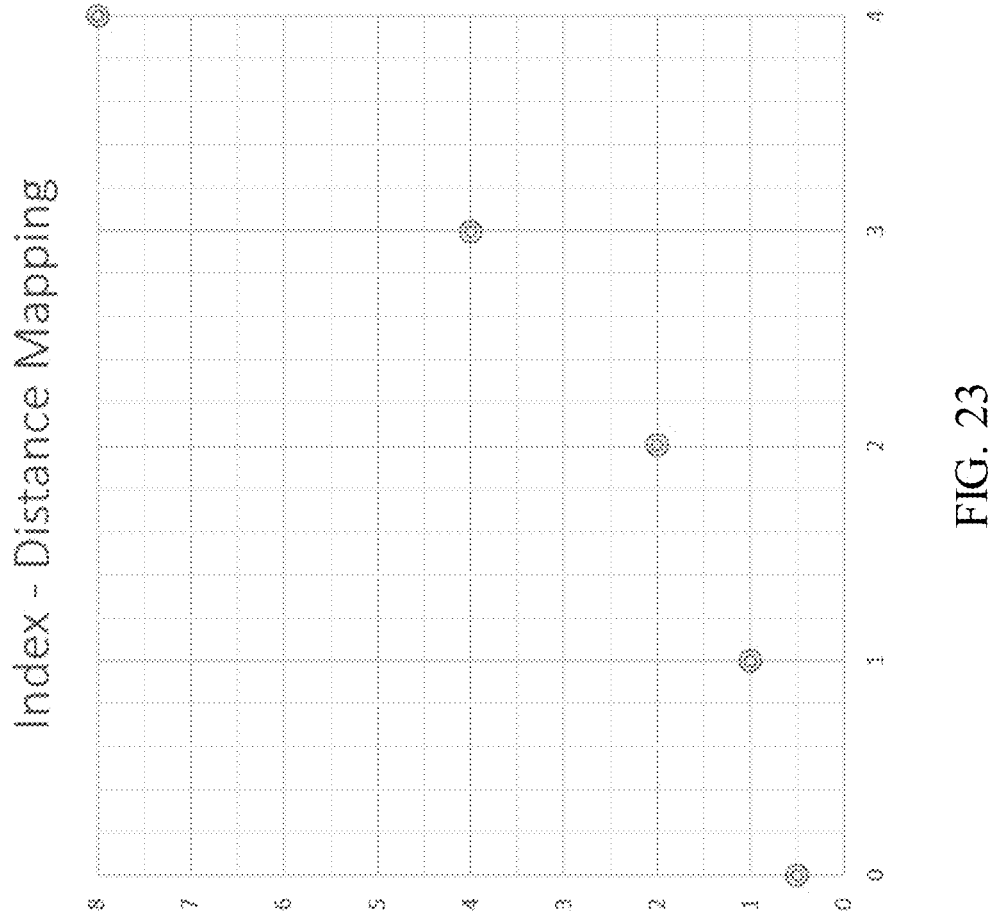
FIG. 23 shows an exemplary mapping between distance index and distance offset.

Distance index is signaled to indicate which distance offset to use. The mapping of distance index and distance offset values is shown in FIG. 23.

The direction index can represent four directions as shown below, where only x or y direction may have an MV difference, but not in both directions.

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

If the inter prediction is uni-directional, the signaled distance offset is applied on the offset direction for each control point predictor. Results will be the MV value of each control point.

For example, when base predictor is uni-directional, and the motion vector values of a control point is MVP ($v_{px}$, $v_{py}$). When distance offset and direction index are signaled, the motion vectors of current block's corresponding control points will be calculated as below.

$$MV(v_x, v_y) = MVP(v_{px}, v_{py}) +$$
$$MV(x - dir - \text{factor}^* \text{distance} - \text{offset}, y - dir - \text{factor}^* \text{distance} - \text{offset})$$

If the inter prediction is bi-directional, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is uni-directional, and the motion vector values of a control point on L0 is MVP$_{L0}$ ($v_{0px}$, $v_{0py}$), and the motion vector of that control point on L1 is MVP$_{L1}$ ($v_{1px}$, $v_{1py}$). When distance offset and direction index are signaled, the motion vectors of current block's corresponding control points will be calculated as below.

$MV_{L0}(v_{0x}, v_{0y}) =$ $\quad MVP_{L0}(v_{0px}, v_{0py}) + MV(x - dir - \text{factor}^*\text{distance} - \text{offset},$ $\qquad\qquad y - dir - \text{factor}^*\text{distance} - \text{offset})$ $MV_{L1}(v_{0x}, v_{0y}) = MVP_{L1}(v_{0px}, v_{0py}) + MV(-x - dir - \text{factor}^*\text{distance} -$ $\qquad\qquad \text{offset}, -y - dir - \text{factor}^*\text{distance} - \text{offset})$

2.14 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (5)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)) \qquad \text{Eq. (6)}$$

Figure 24:
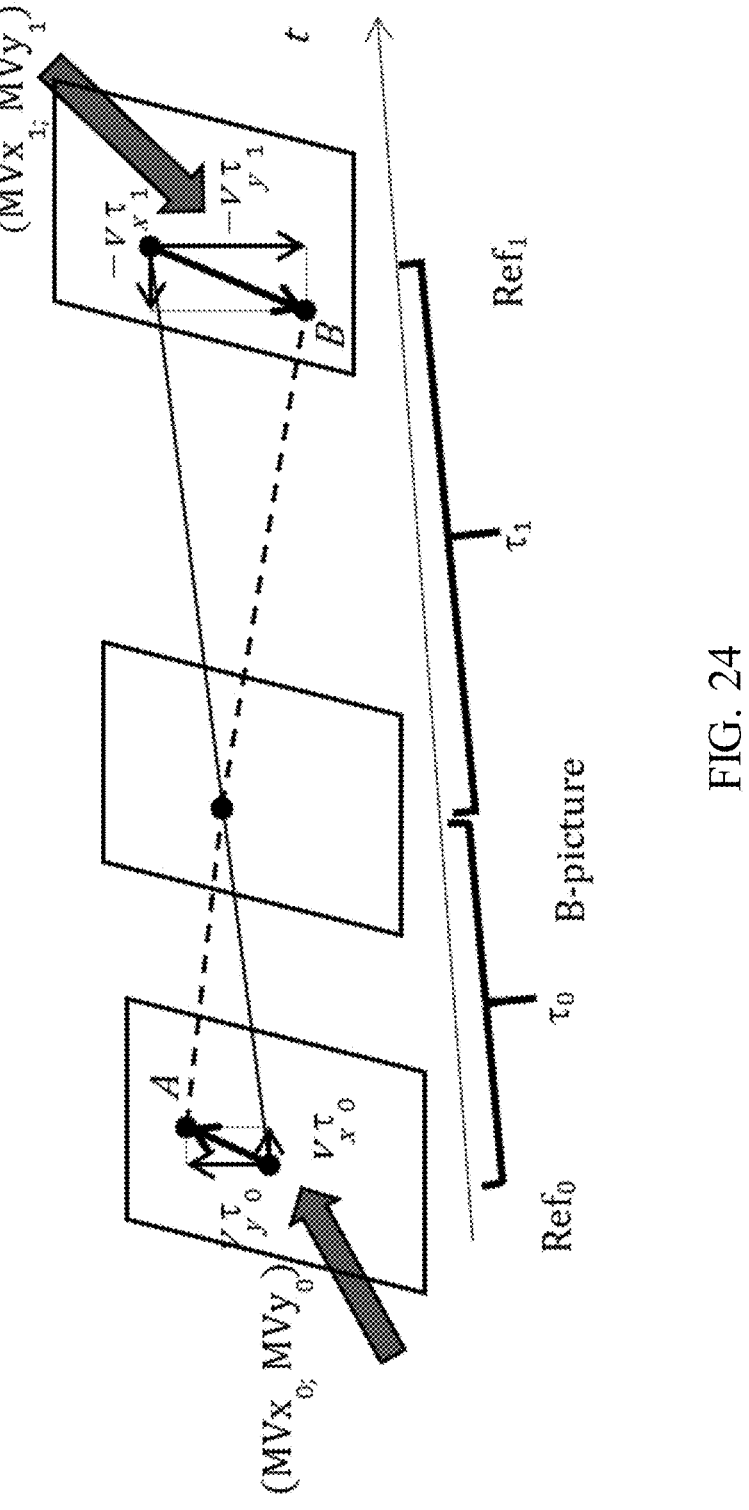
FIG. 24 shows an example of an optical flow trajectory used by the bi-directional optical flow (BIO) algorithm.

FIG. 24 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for Ref$_0$ and Ref$_1$: $\tau_0$=POC(current)–POC(Ref$_0$), $\tau_1$=POC(Ref$_1$)–POC(current). If both predictions come from the same time direction (either both from the past or both from the future) then the signs are different (e.g., $\tau_0\tau_1<0$). In this case, BIO is applied if the prediction is not from the same time moment (e.g., $\tau_0\tau_1$). Both referenced regions have non-zero motion (e.g., MVx$_0$,MXy$_0$,MVx$_1$,MVy$_0\cdot$0) and the block motion vectors are proportional to the time distance (e.g., MVx$_0$/MVx$_1$=MVy$_0$/MVy$_1$=$-\tau_0/\tau_1$).

The motion vector field $(v_x, v_y)$ is determined by minimizing the difference A between values in points A and B. FIGS. 9A-9B show an example of intersection of motion trajectory and reference frame planes. Model uses only first linear term of a local Taylor expansion for A:

$$\Delta = (I^{(0)} + I^{(1)}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \qquad \text{Eq. (7)}$$

All values in the above equation depend on the sample location, denoted as (i', j'). Assuming the motion is consistent in the local surrounding area, $\Delta$ can be minimized inside the (2M+1)×(2M+1) square window $\Omega$ centered on the currently predicted point (i,j), where M is equal to 2:

$$(v_x, v_y) = \underset{v_x, v_y}{\arg\min} \sum_{[i',j']\in\Omega} \Delta^2[i', j'] \qquad \text{Eq. (8)}$$

For this optimization problem, the JEM uses a simplified approach making first a minimization in the vertical direction and then in the horizontal direction. This results in the following:

$$v_x = (s_1 + r) > m? \, clip3\left(-thBIO, thBIO, -\frac{s_3}{(s_1+r)}\right):0 \qquad \text{Eq. (9)}$$

$$v_y = (s_5 + r) > m? clip3\left(-thBIO, thBIO, -\frac{s_6 - v_x s_2/2}{(s_5+r)}\right):0 \qquad \text{Eq. (10)}$$

where, $$S_1 = \sum_{[i',j]\in\Omega} (\tau_1 \partial I^{(1)}/\partial x + \tau_0 \partial I^{(0)}/\partial x)^2; \qquad \text{Eq. (11)}$$

$$S_3 = \sum_{[i',j]\in\Omega} (I^{(1)} - I^{(0)})(\tau_1 \partial I^{(1)}/\partial x + \tau_0 \partial I^{(0)}/\partial x);$$

$$S_2 = \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$S_5 = \sum_{[i',j]\in\Omega} (\tau_1 \partial I^{(1)}/\partial y + \tau_0 \partial I^{(0)}/\partial y)^2;$$

$$S_6 = \sum_{[i',j]\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (9) and Eq. (10), where:

$$r = 500 \cdot 4^{d-8} \qquad \text{Eq. (12)}$$

$$m = 700 \cdot 4^{d-8} \qquad \text{Eq. (13)}$$

Here, d is bit depth of the video samples.

Figure 25B:
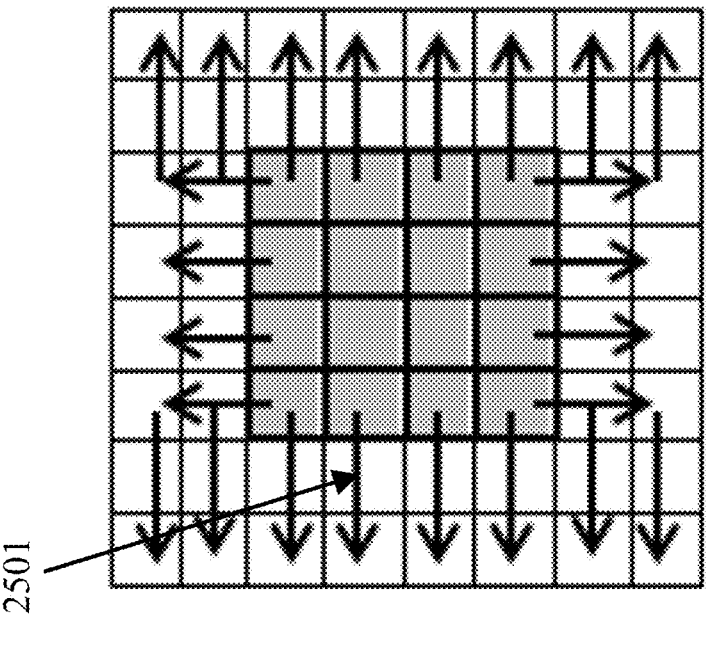
FIGS. 25A and 25B show example snapshots of using of the bi-directional optical flow (BIO) algorithm without block extensions.
Figure 25B:
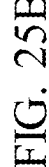
Figure 25A:
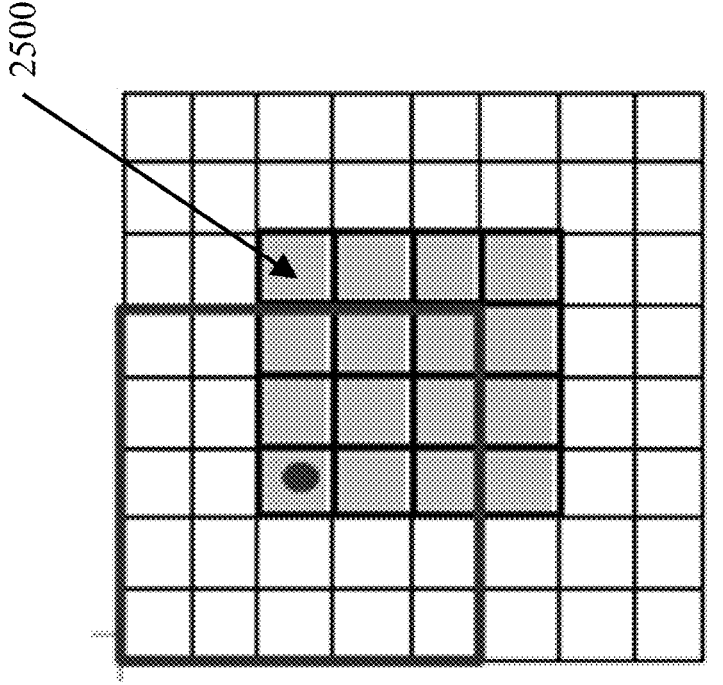

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 25A shows an example of access positions outside of a block 2500. As shown in FIG. 25A, in Eq. (9), (2M+1)×(2M+1) square window $\Omega$ centered in currently predicted point on a boundary of predicted block needs to accesses positions outside of the block. In the JEM, values of $I^{(k)}$,$\partial I^{(k)}/\partial x$, $\partial I^{(k)}/\partial y$ outside of the block are set to be equal to the nearest available value inside the block. For example, this can be implemented as a padding area 2501, as shown in FIG. 25B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y)\in b_k} \sum_{[i',j]\in\Omega(x,y)} (\tau_1 \partial I^{(1)}/\partial x + \tau_0 \partial I^{(0)}/\partial x)^2; \qquad \text{Eq. (14)}$$

$$S_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x);$$

$$S_{2,b_k} = \sum_{(x,y)\in b_k} \sum_{[i',j]\in\Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$S_{5,b_k} = \sum_{(x,y)\in b_k} \sum_{[i',j]\in\Omega} (\tau_1 \partial I^{(1)}/\partial y + \tau_0 \partial I^{(0)}/\partial y)^2;$$

-continued $$S_{6,b_k} = \sum_{(x,y)\in b_k} \sum_{[i',j]\in\Omega} (I^{(1)} - I^{(0)})(\tau_1 \partial I^{(1)} / \partial y + \tau_0 \partial I^{(0)} / \partial y)$$

Here, $b_k$ denotes the set of samples belonging to the k-th 4×4 block of the predicted block. $s_n$ in Eq (9) and Eq (10) are replaced by $((s_{n,bk})\!>\!>\!4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I / \partial x$, a signal is first interpolated vertically using BIOfilterS corresponding to the fractional position fracY with de-scaling shift d-8. Gradient filter BIOfilterG is then applied in horizontal direction corresponding to the fractional position fracX with de-scaling shift by 18-d. For vertical gradient $\partial I / \partial y$, a gradient filter is applied vertically using BIOfilterG corresponding to the fractional position fracY with de-scaling shift d-8. The signal displacement is then performed using BIOfilterS in horizontal direction corresponding to the fractional position fracX with de-scaling shift by 18-d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

| Exemplary filters for gradient calculations in BIO | |
| --- | --- |
| Fractional pel position | Interpolation filter for gradient(BIOfilterG) |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

| Exemplary interpolation filters for prediction signal generation in BIO | |
| --- | --- |
| Fractional pel position | Interpolation filter for prediction signal(BIOfilterS) |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

2.15 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 26:
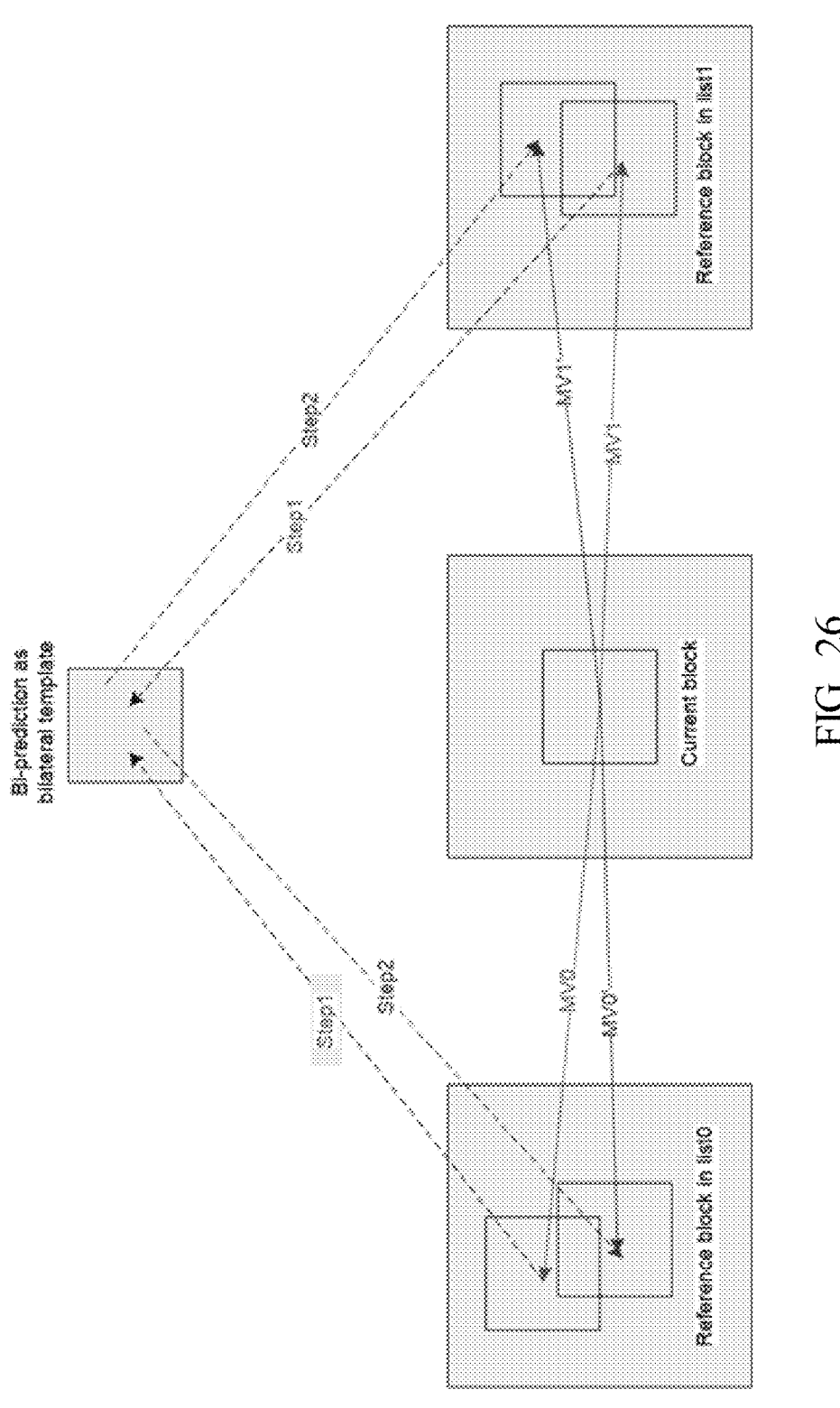
FIG. 26 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 26. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 26, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3. Exemplary Embodiments Related to the Disclosed Technology

The embodiments described in PCT/CN2018/109425 (incorporated by reference herein in its entirety), for example, include an MV update method and a two-step inter prediction method. The derived MV between reference block 0 and reference block 1 in BIO are scaled and added to the original motion vector of list 0 and list 1. Meanwhile, the updated MV is used to perform motion compensation and a second inter prediction is generated as the final prediction. Other embodiments include modifying the temporal gradient by removing the mean difference between reference block 0 and reference block 1. In yet other embodiments, the MV update method and the two-step inter prediction method are extended to be performed multiple times.

4. Drawbacks of Existing Implementations

In some existing implementations, how to apply BIO or/and DMVR or any other decoder side motion vector derivation/refinement tools to CUs coded with multi-hypothesis prediction mode or GBI mode is not well defined.

In other existing implementations that use generalized bi-prediction (GBI), when encoding the weighting factor index (e.g., the GBI index), all bins are coded with context, which is computationally complex.

5. Example Methods for Harmonization of DMVD Tools with Other Tools

Embodiments of the presently disclosed technology overcome the drawbacks of existing implementations, thereby providing video coding with higher coding efficiencies. The harmonization of DMVD tools with other video coding tools, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

The disclosed technology describes how to apply BIO or/and DMVR or any other decoder side motion vector derivation/refinement tools to blocks coded with multi-hypothesis prediction mode or GBI mode. Hereinafter, DMVD (decoder side motion vector derivation) is used to represent BIO or/and DMVR or/and FRUC or/and any other decoder side motion vector derivation/refinement technologies. In addition, extensions of DMVD technologies to other coding methods are also proposed in this document.

The examples described above may be incorporated in the context of the method described below, e.g., methods 2700 and 2750, which may be implemented at a video decoder or a video encoder.

Example 1. It is proposed that DMVD may be performed for blocks coded with multi-hypothesis prediction modes (e.g., as described in Sections 2.9, 2.10 and 2.11).

(a) In one example, for a uni-predicted block with multi-hypothesis, if it is predicted with two reference blocks from different prediction directions, DMVD may be performed.

(b) In one example, if a block is predicted with three reference blocks, DMVD may be performed by selecting two of the reference blocks. Let's denoted the three reference blocks as ref0, ref1 and ref2, suppose ref0 is from prediction direction X and ref1 and ref2 are from prediction direction 1−X, DMVD may be performed for the reference block pair (ref0, ref1) or/and (ref0, ref2).

(i) In one example, DMVD may be only performed once. In this case, either (ref0, ref1) or (ref0, ref2) may be utilized in the DMVD process.

(ii) Alternatively, DMVD may be performed twice. In this case, (ref0, ref1) and (ref0, ref2) may be utilized in the 1$^{st}$ and 2$^{nd}$ DMVD process, respectively. Alternatively, (ref0, ref2) and (ref0, ref1) may be utilized in the 1$^{st}$ and 2$^{nd}$ DMVD process, respectively.

(1) In one example, the refined information (e.g., refined motion information due to BIO or DMVR) of the one DMVD process (e.g., 1$^{st}$ DMVD) may be used as inputs to another DMVD process (e.g., 2$^{nd}$ DMVD). That is, sequential processes of the two DMVD processes may be applied (sequential mode).

(2) Alternatively, the multiple DMVD processes may be invoked with the same inputs such that the multiple processes could be done in parallel (parallel mode).

(iii) In one example, if ref( ) is refined twice by BIO, denoted as ref0_r1 and ref0_r2, then ref0_r1 and ref0_r2 may be used jointly (e.g., averaged or weighted averaged) to generate the final refined value of ref0. For example, ref0'=(ref0_r1+ref0_r2+1)>>1 is used as the refined ref0. Alternatively, either ref0_r1 or ref0_r2 is used as the refined ref0.

(iv) In one example, if motion information (denoted as MV0) of ref( ) is refined twice by BIO or DMVR, denoted as MV0_r1 and MV0_r2, then MV0_r1 and MV0_r2 may be used jointly (e.g., averaged or weighted averaged) to generate the final refined values of MV0. For example, MV0'=(MV0_r1+MV0_r2+1)>>1 is used as the refined MV0. Alternatively, either MV0_r1 or MV0_r2 is used as the refined MV0.

(c) In one example, if a block is predicted with N reference blocks, and M reference blocks are from prediction direction X and N−M reference blocks are from prediction direction 1−X, DMVD may be performed for any of/some of two reference blocks wherein one is from prediction direction X and another is from prediction direction 1−X.

(i) Similar to (b)(ii), multiple times of DMVD processes may be invoked either in parallel mode or sequential mode.

(ii) In one example, if a reference block is refined T times by BIO, then partial or all of these T refined values may be jointly used to derive the final refined value of the reference block (e.g., using average or weighted average).

(iii) Alternatively, if a reference block is refined T times by BIO, then partial or all of PT refined values may be jointly used to derive the final refined value of the reference block (e.g., using average or weighted average). For example, PT is equal to 1, 2, 3, 4, . . . , T−1.

(iv) In one example, if motion information of a reference block is refined T times by e.g., BIO or DMVR, then partial or all of these T refined MVs may be jointly used to derive the final refined MV of the reference block (e.g., using average or weighted average).

(v) Alternatively, if motion information of a reference block is refined T times by e.g., BIO or DMVR, then partial or all of PT refined MVs may be jointly used (e.g., using average or weighted average) to derive the final refined values of the reference block. For example, PT is equal to 1, 2, 3, 4, . . . , T−1.

(d) In one example, if a block is predicted with multiple sets of motion information (for example, one set of motion information is from AMVP mode and another set of motion information is from merge candidate (e.g., as described in Section 2.10) or both sets of motion information are from merge candidates (e.g., as described in Section 2.11)), DMVD may be performed for each/some set of motion information.

(i) In one example, DMVD is invoked when the motion information is bi-directional motion information.

(ii) In one example, in multi-hypothesis inter prediction mode (as described in Section 2.9), DMVD is only performed for non-additional motion information.

(e) In one example, DMVD may be performed at most once.

(i) For example, if a block is coded with multi-hypothesis merge/skip mode (e.g., as described in Section 2.11), DMVD is performed only for the $1^{st}$ selected merge candidate.

(1) Alternatively, DMVD is performed only for the $2^{nd}$ selected merge candidate.

(2) Alternatively, the two/N selected merge candidates are checked in order, and DMVD is only performed for the first available bi-directional merge candidate.

(ii) For example, if a block is coded with multi-hypothesis AMVP mode (as described in Section 2.10), DMVD is performed only for the merge candidate.

(iii) For example, if a block is coded with multi-hypothesis inter prediction mode (e.g., as described in Section 2.9), the first available reference block from List 0 and List 1 (if there is any) are identified according to the signaling order of the corresponding syntax elements, and DMVD is performed only for these two reference blocks.

Example 2. It is proposed that when asymmetric weighting factors are used for bi-directional prediction (like GBI, LIC etc.) or multi-hypothesis prediction, such weighting factors may be used in DMVD process.

(a) In one example, before calculating temporal gradients or/and spatial gradients in BIO, each reference block may be scaled by its corresponding weighting factor.

(b) In one example, when performing the bi-lateral matching or template matching in DMVR, each reference block may be scaled by its corresponding weighting factor.

(c) In one example, if template matching is used in DMVR, such weighting factors may be used when generating the template.

Example 3. It is proposed that DMVD may be used in AMVP mode when all MVD components are zero. Alternatively, if MVD component is zero in prediction direction X and is non-zero in prediction direction 1–X, DMVD may be used to refine motion vector in prediction direction X. In one example, in DMVR, prediction signal in list 1–X is used as a template to find the best motion vector in list X.

Example 4. It is proposed that DMVD may be used to refine the translational motion parameters in bi-directional affine mode or UMVE affine mode.

(a) Alternatively, in bi-directional affine inter mode, DMVD is used to refine the translational motion parameters only when MVD of the translational motion parameters are all zero.

(b) Alternatively, in UMVE affine mode, DMVD is used to refine the translational motion parameters only when MVD of the translational motion parameters are all zero.

Example 5. It is proposed that DMVD may be enabled in UMVE mode.

(a) Alternatively, DMVD is disabled when there is non-zero MVD component in UMVE mode.

(b) Alternatively, DMVD is disabled in UMVE mode.

Example 6. It is proposed that whether to enable DMVD may be depend on the decoded motion information.

a. It is proposed that DMVD may be enabled when absolute value (denoted as ABS(MV) of MV and/or MVD and/or decoded motion vector (denoted as (MV_x, MV_y)) of a block is less than a threshold TH1, wherein TH1>=0.

i. ABS(MV) may be defined as

1. ABS(MV)=abs(MV_x)

2. ABS(MV)=abs(MV_y)

3. ABS(MV)=f(abs(MV_x), abs(MV_y)), where f is a function.

a. ABS(MV)=min(abs(MV_x), abs(MV_y));

b. ABS(MV)=max(abs(MV_x), abs(MV_y));

c. ABS(MV)=abs(MV_x)+abs(MV_y);

d. ABS(MV)=(abs(MV_x)+abs(MV_y))/2;

ii. In one example, if ABS(MV) of a block is less than TH1 in any prediction direction, DMVD may be enabled.

iii. In one example, if ABS(MV) of a block is less than TH1 in both prediction directions, DMVD may be enabled.

iv. In one example, it is required both components (horizontal/vertical) of the absolute MV and/or absolute MVD are less than a threshold. Alternatively, two thresholds are used, one for horizontal component and the other one for vertical component. it is required the horizontal component is less than the first threshold and the vertical component is less than the second threshold.

v. In one example, it is required either the horizontal component is less than the first threshold or the vertical component is less than the second threshold.

vi. In some example, the first and the second thresholds are the same.

vii. In one example, such method may be not applied to non-UMVE merge mode.

viii. In one example, such method may be not applied to UMVE mode.

ix. In one example, such method may be not applied to AMVP mode.

x. The MV or MVD mentioned above may be derived from the AMVP mode, or it may be derived from UMVE (a.k.a MMVD) mode.

b. It is proposed that DMVD may be enabled when absolute value (denoted as ABS(MV) of MV and/or MVD and/or decoded motion vector (denoted as (MV_x, MV_y)) of a block is greater than a threshold TH2, wherein TH2>=0.

i. ABS(MV) may be defined as

1. ABS(MV)=abs(MV_x)

2. ABS(MV)=abs(MV_y)

3. ABS(MV)=f(abs(MV_x), abs(MV_y)), where f is a function.

a. ABS(MV)=min(abs(MV_x), abs(MV_y));

b. ABS(MV)=max(abs(MV_x), abs(MV_y));

c. ABS(MV)=abs(MV_x)+abs(MV_y);

d. ABS(MV)=(abs(MV_x)+abs(MV_y))/2;

ii. In one example, if ABS(MV) of a block is greater than TH2 in any prediction direction, DMVD may be disabled.

iii. In one example, if ABS(MV) of a block is greater than TH2 in both prediction directions, DMVD may be disabled.

iv. In one example, it is required both components (horizontal/vertical) of the absolute MV and/or absolute MVD are larger than a threshold. Alternatively, two thresholds are used, one for horizontal component and the other one for vertical component. it is required the horizontal component is larger than the first threshold and the vertical component is larger than the second threshold.

v. In one example, it is required either the horizontal component is larger than the first threshold or the vertical component is larger than the second threshold.

vi. In some example, the first and the second thresholds are the same.

vii. In one example, such method may be not applied to non-UMVE merge mode.

viii. In one example, such method may be not applied to UMVE mode.

ix. In one example, such method may be not applied to AMVP mode.

x. The MV or MVD mentioned above may be derived from the AMVP mode, or it may be derived from UMVE (a.k.a MMVD) mode.

c. When a block is coded with bi-prediction, only motion information of one reference picture list may be utilized.

i. Alternatively, motion information of both reference picture lists may be used. In one example, the MVs (or MVDs) are the max/min/averaged MV (or MVD) of two reference picture list.

d. It is proposed for the bi-prediction case, whether to enable or disable DMVD, it may depend on the distance of two motion vectors of each reference picture list.

e. Determination of enabling/disabling DMVD may be controlled separately for each reference picture list.

Example 7. It is proposed that DMVD may be applied under certain conditions, such as based on block sizes, encoding mode, motion information, slice/picture/tile types.

(a) In one example, when a block size contains less than M*H samples, e.g., 16 or 32 or 64 luma samples, DMVD is not allowed.

(b) In one example, when a block size contains more than M*H samples, e.g., 16 or 32 or 64 luma samples, DMVD is not allowed.

(c) Alternatively, when minimum size of a block's width or height is smaller than or no larger than X, DMVD is not allowed. In one example, X is set to 8.

(d) Alternatively, when a block's width >th1 or ≥th1 and/or a block's height >th2 or ≥th2, DMVD is not allowed. In one example, X is set to 64.

(i) For example, DMVD is disabled for 128×128 block.

(ii) For example, DMVD is disabled for N×128/128×N block, for N≥64.

(iii) For example, DMVD is disabled for N×128/128×N block, for N≥4.

(e) Alternatively, when a block's width <th1 or ≤th1 and/or a block's height <th2 or ≤th2, DMVD is not allowed. In one example th1 or th2 is set to 8.

(f) In one example, DMVD is disabled for blocks coded in AMVP mode.

(g) In one example, DMVD is disabled for blocks coded in skip mode.

(h) In one example, DMVD is disabled for the block if GBI is used.

(i) In one example, DMVD is disabled for a block if multi-hypothesis inter prediction (as described in Sections 2.9, 2.10 and 2.11) is used, e.g., if the CU is predicted from more than 2 reference blocks.

(j) In one example, DMVD is disabled for the block/sub-block when absolute mean difference of the two reference blocks/sub-blocks is larger than a threshold.

Example 8. It is proposed that DMVD may be applied in a sub-block level.

(a) In one example, DMVD may be invoked for each sub-block.

(b) In one example, when a block with either width or height or both width and height are both larger than (or equal to) a threshold L, the block may be split into multiple sub-blocks. Each sub-block is treated in the same way as a normal coding block with size equal to the sub-block size.

(i) In one example, L is 64, a 64×128/128×64 block is split into two 64×64 sub-blocks, and a 128×128 block is split into four 64×64 sub-blocks. However, N×128/128×N block, wherein N<64, is not split into sub-blocks.

(ii) In one example, L is 64, a 64×128/128×64 block is split into two 64×64 sub-blocks, and a 128×128 block is split into four 64×64 sub-blocks. Meanwhile, N×128/128×N block, wherein N<64, is split into two N×64/64×N sub-blocks.

(c) The threshold L may be pre-defined or signaled in SPS/PPS/picture/slice/tile group/tile level.

(d) Alternatively, the thresholds may depend on certain coded information, such as block size, picture type, temporal layer index, etc.

Example 9. In one example, whether to and how to apply the above methods (e.g., motion refinement methods such as DMVR or/and BIO and/or other decoder side motion refinement technologies) depends on the reference picture.

(a) In one example, motion refinement methods are not applied if the reference picture is the current coding picture.

(b) In one example, multi-time motion refinement methods claimed in previous bullets are not applied if the reference picture is the current coding picture.

Example 10. The above methods as well as the existing DMVD methods (e.g., BIO/DMVR) may be also applied even two reference blocks/reference pictures are from the same reference picture list.

(a) Alternatively, furthermore, when two reference blocks are from same reference picture list, it is required that the two reference pictures are crossing the current picture covering current block. That is, one reference picture has a smaller POC value and the other has a larger POC value compared to POC of the current picture.

(b) In one example, the condition check of the prediction direction is bi-prediction for enabling/disabling BIO is removed. That is, whether BIO or DMVD is enabled or not is independent from the prediction direction value.

(c) When product of the POC differences between current picture and its two reference pictures (either from same reference picture list, or different reference picture lists) is smaller than 0, BIO or DMVD may be enabled.

(d) When product of the POC differences between current picture and its two reference pictures (either from same reference picture list, or different reference picture lists) is smaller than or equal to 0 (e.g., one or two reference picture is the current picture), BIO or DMVD may be enabled.

Example 11. It is proposed that when encoding the GBI index, some bins are bypass coded. Denote the maximum length of the code bins of GBI index as maxGBIIdxLen.

(a) In one example, only the first bin is coded with context and all other bins are bypass coded.

(i) In one example, one context is used for encoding the first bin.

(ii) In one example, more than 1 contexts are used for encoding the first bin. For example, 3 contexts are used as follows:

(1) ctxIdx=aboveBlockIsGBIMode+leftBlockIs-GBIMode;

(2) aboveBlockIsGBIMode equals to 1 if the above neighboring block is coded in GBI mode, otherwise it equals to 0; and (3) leftBlockIsGBIMode equals to 1 if the left neighboring block is coded in GBI mode, otherwise it equals to 0.

(b) In one example, only the first K bins are coded with contexts and all other bins are bypass coded, wherein 0=<K<=maxGBIIdxLen.

(i) In one example, one context is shared for all context coded bins except the first bin.

(ii) In one example, one context is used for each context coded bin except the first bin.

FIG. 27A shows a flowchart of an exemplary method for video processing. The method 2700 includes, at operation 2702, making a decision, for a conversion between a current block of a video and a bitstream representation of the video, regarding a selective enablement of a decoder side motion vector derivation (DMVD) tool for the current block, the DMVD tool deriving a refinement of motion information signaled in the bitstream representation, and the conversion using a merge mode and motion vector differences that are indicated by a motion direction and a motion magnitude.

The method 2700 includes, at operation 2704, performing, based on the decision, a conversion between the current block and the bitstream representation.

Figure 27B:
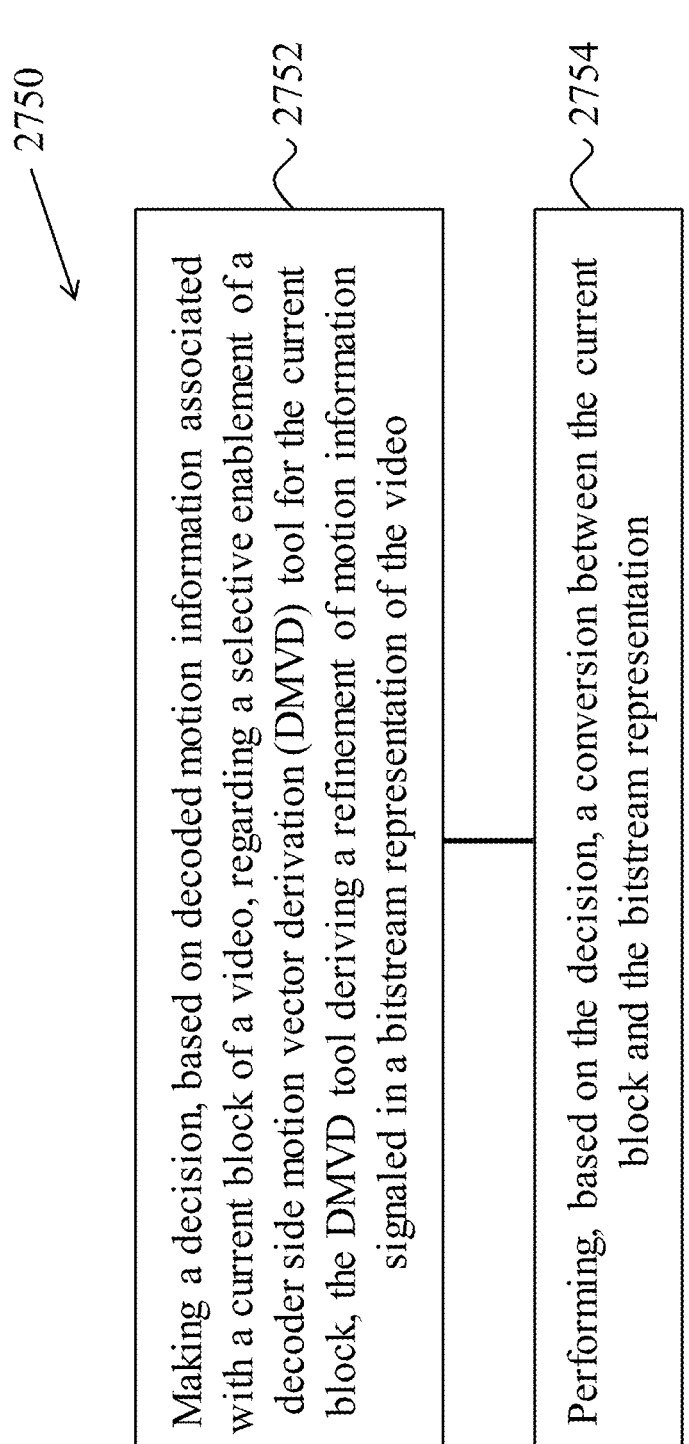

FIG. 27B shows a flowchart of an exemplary method for video processing. The method 2750 includes, at operation 2752, making a decision, based on decoded motion information associated with a current block of a video, regarding a selective enablement of a decoder side motion vector derivation (DMVD) tool for the current block, the DMVD tool deriving a refinement of motion information signaled in a bitstream representation of the video.

The method 2750 includes, at operation 2754, performing, based on the decision, a conversion between the current block and the bitstream representation.

In some embodiments, the following technical solutions may be implemented:

1. A method (e.g., method 2700 in FIG. 27A) for video processing, comprising: making (2702) a decision, for a conversion between a current block of a video and a bitstream representation of the video, regarding a selective enablement of a decoder side motion vector derivation (DMVD) tool for the current block, wherein the DMVD tool derives a refinement of motion information signaled in the bitstream representation, and wherein the conversion uses a merge mode and motion vector differences that are indicated by a motion direction and a motion magnitude; and performing (2704), based on the decision, a conversion between the current block and the bitstream representation. For example, in some cases, the decision may be to enable DMVD, in which case encoding or decoding of the current block is performed using DMVD. In some cases, the decision may be to disable (or not use) DMVD, in which case the encoding or the decoding may be performed without using the DMVD tool.

2. The method of solution 1, wherein the DMVD tool is enabled.

3. The method of solution 1, wherein the DMVD tool is disabled.

4. The method of solution 1, wherein the DMVD tool is disabled upon a determination that the current block is coded using the merge mode.

5. The method of any of solutions 1 to 4, wherein the merge mode further comprises a starting point of motion information indicated by a merge index, and wherein a final motion information of the current block is based on the motion vector differences and the starting point.

6. The method of solution 1, wherein the DMVD tool is disabled upon a determination that the merge mode comprises a non-zero motion vector difference (MVD) component.

7. A method (e.g., method 2750 in FIG. 27B) for video processing, comprising: making (2752) a decision, based on decoded motion information associated with a current block of a video, regarding a selective enablement of a decoder side motion vector derivation (DMVD) tool for the current block, wherein the DMVD tool derives a refinement of motion information signaled in a bitstream representation of the video; and performing (2754), based on the decision, a conversion between the current block and the bitstream representation.

8. The method of solution 7, wherein the DMVD tool is enabled upon a determination that (1) an absolute value of motion vector, or (2) an absolute value of a motion vector difference, or (3) an absolute value of a decoded motion vector of the current block is (a) less than a threshold TH1, wherein TH1≥0, or (b) greater than a threshold TH2, wherein TH2≥0.

9. The method of solution 7, wherein the DMVD tool is enabled upon a determination that an absolute value of a decoded motion vector of the current block in a horizontal or vertical prediction direction is (a) less than a threshold THh1 or THv1, respectively, wherein $THh_1 \geq 0$ and THv1≥0, or (b) greater than a threshold THh2 or THv2, respectively, wherein THh2≥0 and THv2≥0.

10. The method of solution 8 or 9, wherein the current block is coded using a bi-prediction mode, and wherein the decision is further based on motion information from only one reference picture list associated with the current block.

11. The method of solution 8 or 9, wherein the current block is coded using a bi-prediction mode, and wherein the decision is based on motion information from both reference picture lists associated with the current block.

12. The method of any of solutions 7 to 9, wherein the DMVD tool is enabled upon a determination that the current block is not encoded using a specific encoding mode.

13. The method of solution 12, wherein the specific encoding mode includes an ultimate motion vector expression (UMVE) mode or an advanced motion vector prediction (AMVP) mode.

14. The method of solution 12, wherein the specific encoding mode excludes a bi-prediction mode and includes a condition in which a distance between two motion vectors of each reference picture list for the current block is greater than or less than a predetermined value.

15. The method of solution 7, wherein the DMVD tool is enabled upon a determination that a function of an absolute value of a decoded motion vector (MV) of the current block in a horizontal prediction direction (MV_x) and a vertical prediction direction (MV_y) is (a) less than a threshold TH1, wherein TH1≥0, or (b) greater than a threshold TH2, wherein TH2≥0.

16. The method of solution 15, wherein the function is one of: f(abs(MV))=min(abs(MV_x), abs(MV_y)), or f(abs (MV))=max(abs(MV_x), abs(MV_y)), or f(abs(MV))=(abs (MV_x)+abs(MV_y)), or f(abs(MV))=(abs(MV_x)+abs (MV_y))/2.

17. The method of any of solutions 1 to 16, wherein the DMVD tool comprises at least one of a bi-directional optical flow (BIO) algorithm, a decoder-side motion vector refinement (DMVR) algorithm or a frame-rate up conversion (FRUC) algorithm.

18. The method of any of solutions 1 to 17, wherein the conversion generates the current block from the bitstream representation.

19. The method of any of solutions 1 to 17, wherein the conversion generates the bitstream representation from the current block.

20. An apparatus in a video system comprising a processor and a non-transitory memory with instructions thereon, wherein the instructions upon execution by the processor, cause the processor to implement the method in any one of solutions 1 to 19.

21. A computer program product stored on a non-transitory computer readable media, the computer program product including program code for carrying out the method in any one of solutions 1 to 19.

6. Example Implementations of the Disclosed Technology

Figure 28:
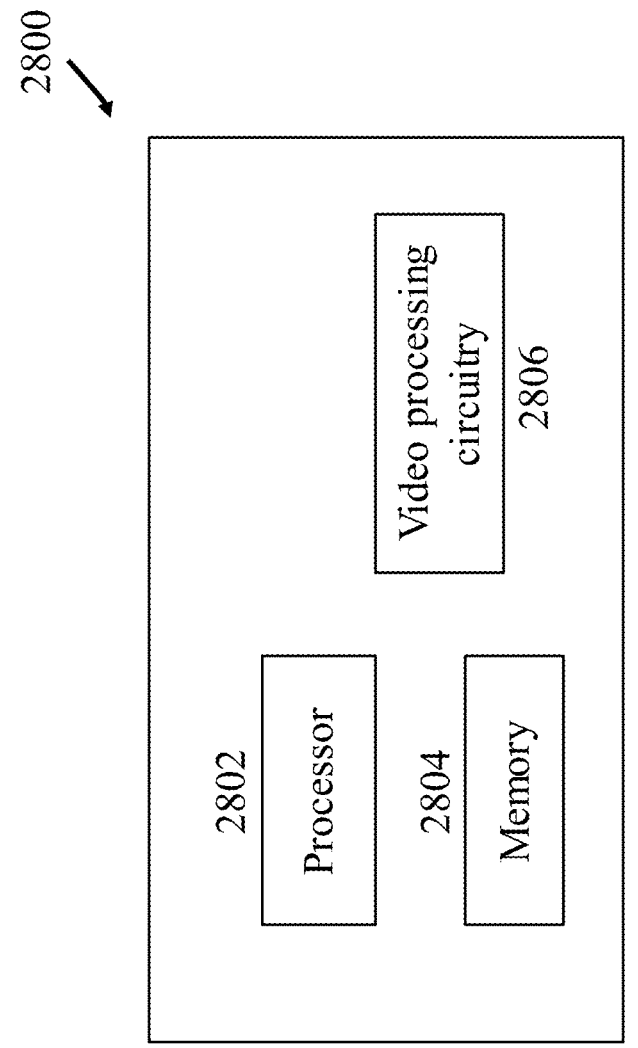
FIG. 28 is a block diagram of an example of a hardware platform for implementing a visual media decoding or a visual media encoding technique described in the present document.

FIG. 28 is a block diagram of a video processing apparatus 2800. The apparatus 2800 may be used to implement one or more of the methods described herein. The apparatus 2800 may be embodied in a smartphone, tablet, computer, Internet of Things (IoT) receiver, and so on. The apparatus 2800 may include one or more processors 2802, one or more memories 2804 and video processing hardware 2806. The processor(s) 2802 may be configured to implement one or more methods (including, but not limited to, method 2700) described in the present document. The memory (memories) 2804 may be used for storing data and code used for implementing the methods and techniques described herein. The video processing hardware 2806 may be used to implement, in hardware circuitry, some techniques described in the present document.

In some embodiments, the video coding methods may be implemented using an apparatus that is implemented on a hardware platform as described with respect to FIG. 28.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 29:
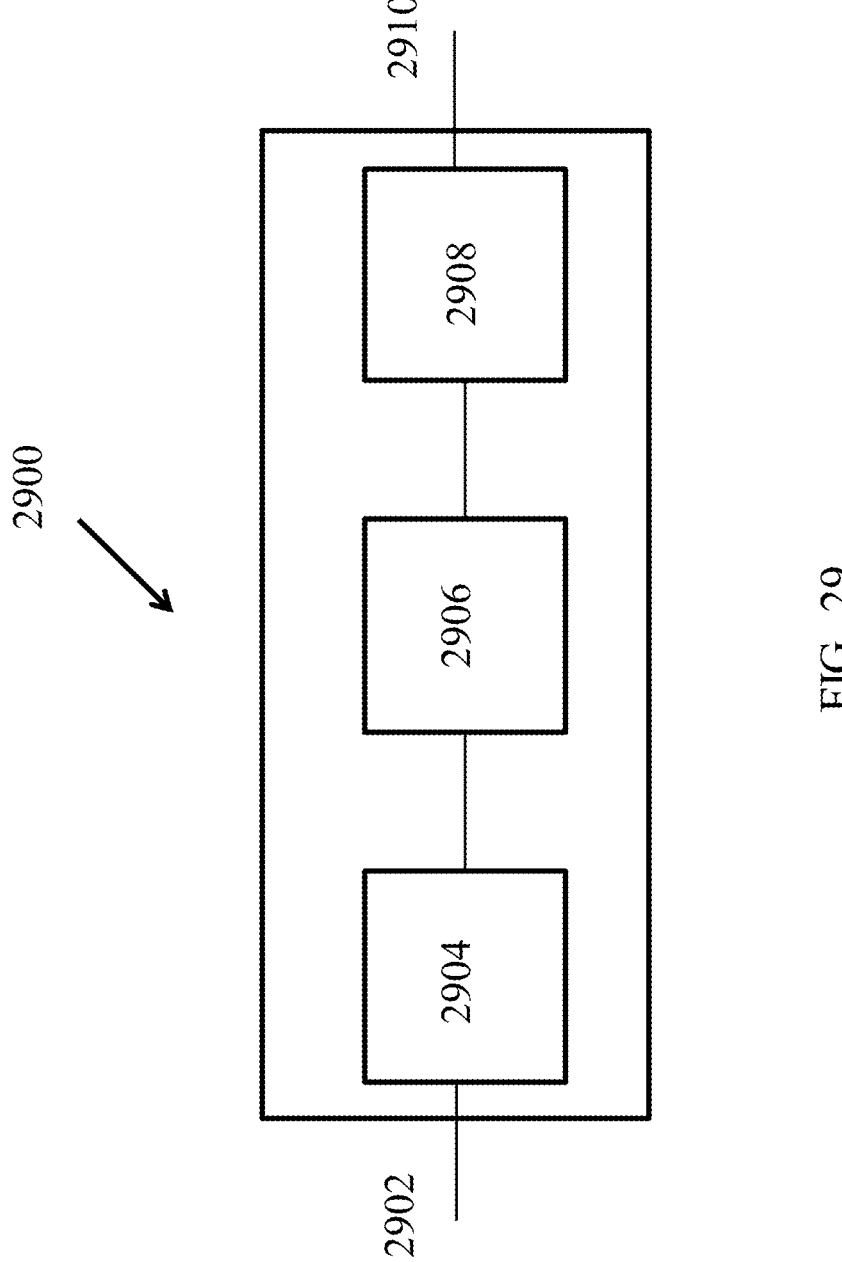
FIG. 29 is a block diagram of an example video processing system in which disclosed techniques may be implemented.

FIG. 29 is a block diagram showing an example video processing system 2900 in which various techniques disclosed herein may be implemented. Various implementations may include some or all of the components of the system 2900. The system 2900 may include input 2902 for receiving video content. The video content may be received in a raw or uncompressed format, e.g., 8 or 10 bit multicomponent pixel values, or may be in a compressed or encoded format. The input 2902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2900 may include a coding component 2904 that may implement the various coding or encoding methods described in the present document. The coding component 2904 may reduce the average bitrate of video from the input 2902 to the output of the coding component 2904 to produce a coded representation of the video. The coding techniques are therefore sometimes called video compression or video transcoding techniques. The output of the coding component 2904 may be either stored, or transmitted via a communication connected, as represented by the component 2906. The stored or communicated bitstream (or coded) representation of the video received at the input 2902 may be used by the component 2908 for generating pixel values or displayable video that is sent to a display interface 2910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:

making a first decision, for a conversion between a current block of a video and a bitstream of the video, regarding whether a decoder side motion vector derivation (DMVD) tool forth current block is enabled based on a size of the current block or whether a coding mode of the current block is enabled for the conversion, wherein the DMVD tool derives a refinement of motion information, and wherein the DMVD tool comprises a bi-directional optical flow tool;

performing, based on the first decision, the conversion between the current block and the bitstream, wherein the bi-directional optical flow tool is disabled upon a determination that the coding mode of the current block is a generalized bi-prediction (GBI) mode in which asymmetric weights in coding unit (CU)-level are applied to two prediction blocks generated from a reference picture list 0 and a reference picture list 1 to derive a final prediction block of the current block;

wherein the method further comprises:

dividing a coding tree unit (CTU) into a plurality of coding units (CUs);

constructing a motion candidate list for a current coding unit (CU);

deriving motion information for the current CU based on the motion candidate list;

dividing the current CU into a plurality of sub-CUs, when at least one condition of a size of the current CU is met;

making a second decision regarding a selective enablement of the DMVD tool at a sub-CU level; and performing, based on the second decision, a conversion between the current CU and the bitstream, wherein when a height (H) or a width (W) of the current CU is greater than a threshold (L), the current CU is divided into multiple sub-CUs, and wherein L is a positive integer, and L is predetermined, wherein the GBI mode is configured to select a weight w from a set of weights based on a weight index of the GBI mode to generate a bi-prediction signal for the current block, and wherein the set of weights comprises multiple weights that are different from 1/2, wherein the weight index is represented by a bin string which is comprised in the bitstream and is used to select the weight w from the set of weights, and the bin string comprises a plurality of bins and at least one bin of the plurality of bins is bypass coded, wherein the set of weights comprises all probable weights different from 1/2 corresponding to the GBI mode, wherein the asymmetric weights comprise the weight w and a weight 1-w, wherein a first bin of the plurality of bins is coded with at least one context, wherein all other bins of the plurality of bins are bypass coded, and wherein the at least one context consists of one context, and wherein in response to the weight w being not equal to the weight 1-w, a bi-directional optical flow mode is not applied for the current block, and wherein the bi-directional optical flow mode uses gradients in different directions to derive a motion offset and a prediction offset.

2. The method of claim 1, wherein the coding mode comprises a merge mode with a motion vector difference.

3. The method of claim 2, wherein the merge mode with the motion vector difference indicates a motion vector difference and a starting point of motion information.

4. The method of claim 3, wherein the motion vector difference is indicated by a motion direction and a motion magnitude, and the starting point of motion information is indicated by a merge indication, and wherein a final motion information of the current block is based on the motion vector difference and the starting point.

5. The method of claim 2, wherein the DMVD tool is disabled when a condition is satisfied, and wherein the condition is at least one of:

(a) the current block is coded using an advanced motion vector prediction (AMVP) mode, (b) a reference picture of the current block is a current coding picture, (c) either a width or a height of the current block is less than 8 pixels, (d) the current block is coded with an affine mode, or (e) the current block is coded using the merge mode with the motion vector difference.

6. The method of claim 1, wherein the DMVD tool further comprises a frame-rate up conversion algorithm.

7. The method of claim 2, wherein the merge mode with the motion vector difference indicates that the motion vector difference comprises a non-zero motion vector difference (MVD) component.

8. The method of claim 1, wherein whether the DMVD tool for the current block is enabled is further based on whether the GBI mode is enabled.

9. The method of claim 8, wherein the DMVD tool is disabled when the current block is coded using the GBI mode.

10. The method of claim 1, wherein whether the DMVD tool is enabled is further based on motion information of the current block.

11. The method of claim 10, wherein the DMVD tool is enabled upon a determination that (1) an absolute value of a motion vector, or (2) an absolute value of a motion vector difference, or (3) an absolute value of a motion vector of the current block is (a) less than a threshold TH1, wherein TH1≥0, or (b) greater than a threshold TH2, wherein TH2≥0.

12. The method of claim 10, wherein the DMVD tool is enabled upon a determination that an absolute value of a decoded motion vector of the current block in a horizontal or vertical prediction direction is (a) less than a threshold THh1 or THv1, respectively, wherein THh1 ≥0 and THv1≥0, or (b) greater than a threshold THh2 or THv2, respectively, wherein THh2≥0 and THv2≥0.

13. The method of claim 10, wherein the DMVD tool is enabled upon a determination that a function of an absolute value of a decoded motion vector (MV) of the current block in a horizontal prediction direction (MV_x) and a vertical prediction direction (MV_y) is (a) less than a threshold TH1, wherein TH1≥0, or (b) greater than a threshold TH2, wherein TH2≥0, wherein the current block is coded using a bi-prediction mode, and wherein the first decision is further based on (a) the motion information from only one reference picture list associated with the current block, or (b) the motion information from both reference picture lists associated with the current block.

14. The method of claim 1, wherein the conversion comprises decoding the current block from the bitstream.

15. The method of claim 1, wherein the conversion comprises encoding the current block into the bitstream.

16. The method of claim 1, wherein the DMVD tool is disabled when a product of a width and a height of the current block is less than a predefined value, and the predefined value is 128.

17. The method of claim 1, wherein the DMVD tool is disabled when the coding mode is enabled for the conversion and a prediction signal of the current block is generated at least based on a weighted sum of an intra prediction signal and an inter prediction signal of the current block by using the coding mode.

18. An apparatus for processing video data comprising a processor and a non-transitory memory with instructions thereon, wherein the instructions upon execution by the processor, cause the processor to:

make a first decision, for a conversion between a current block of a video and a bitstream of the video, regarding whether a decoder side motion vector derivation (DMVD) tool for the current block is enabled based on a size of the current block or whether a coding mode of the current block is enabled for the conversion, wherein the DMVD tool derives a refinement of motion information, and wherein the DMVD tool comprises a bi-directional optical flow tool ;

perform, based on the first decision, the conversion between the current block and the bitstream, wherein the bi-directional optical flow tool is disabled upon a determination that the coding mode of the current block is a generalized bi-prediction (GBI) mode in which asymmetric weights in coding unit (CU)-level are applied to two prediction blocks generated from a reference picture list 0 and a reference picture list 1 to derive a final prediction block of the current block;

wherein the instructions upon execution by the processor further cause the processor to:

divide a coding tree unit (CTU) into a plurality of coding units (CUs);

construct a motion candidate list for a current coding unit (CU);

derive motion information for the current CU based on the motion candidate list;

divide the current CU into a plurality of sub-CUs, when at least one condition of a size of the current CU is met;

make a second decision regarding a selective enablement of the DMVD tool at a sub-CU level; and perform, based on the second decision, a conversion between the current CU and the bitstream, wherein when a height (H) or a width (W) of the current CU is greater than a threshold (L), the current CU is divided into multiple sub-CUs, and wherein L is a positive integer, and L is predetermined, wherein the GBI mode is configured to select a weight w from a set of weights based on a weight index of the GBI mode to generate a bi-prediction signal for the current block, and wherein the set of weights comprises multiple weights that are different from 1/2, wherein the weight index is represented by a bin string which is comprised in the bitstream and is used to select the weight w from the set of weights, and the bin string comprises a plurality of bins and at least one bin of the plurality of bins is bypass coded, wherein the set of weights comprises all probable weights different from 1/2 corresponding to the GBI mode, wherein the asymmetric weights comprise the weight w and a weight 1-w, wherein a first bin of the plurality of bins is coded with at least one context, wherein all other bins of the plurality of bins are bypass coded, and wherein the at least one context consists of one context, and wherein in response to the weight w being not equal to the weight 1-w, a bi-directional optical flow mode is not applied for the current block, and wherein the bi-directional optical flow mode uses gradients in different directions to derive a motion offset and a prediction offset.

19. A non-transitory computer-readable storage medium storing instructions that cause a processor to:

make a first decision, for a conversion between a current block of a video and a bitstream of the video, regarding whether a decoder side motion vector derivation (DMVD) tool for the current block is enabled based on a size of the current block or whether a coding mode of the current block is enabled for the conversion, wherein the DMVD tool derives a refinement of motion information, and wherein the DMVD tool comprises a bi-directional optical flow tool ;

perform, based on the first decision, the conversion between the current block and the bitstream, wherein the bi-directional optical flow tool is disabled upon a determination that the coding mode of the current block is a generalized bi-prediction (GBI) mode in which asymmetric weights in coding unit (CU)-level are applied to two prediction blocks generated from a reference picture list 0 and a reference picture list 1 to derive a final prediction block of the current block;

wherein the instructions further cause the processor to:

divide a coding tree unit (CTU) into a plurality of coding units (CUs);

construct a motion candidate list for a current coding unit (CU);

derive motion information for the current CU based on the motion candidate list;

divide the current CU into a plurality of sub-CUs, when at least one condition of a size of the current CU is met;

make a second decision regarding a selective enablement of the DMVD tool at a sub-CU level; and perform, based on the second decision, a conversion between the current CU and the bitstream, wherein when a height (H) or a width (W) of the current CU is greater than a threshold (L), the current CU is divided into multiple sub-CUs, and wherein L is a positive integer, and L is predetermined, wherein the GBI mode is configured to select a weight w from a set of weights based on a weight index of the GBI mode to generate a bi-prediction signal for the current block, and wherein the set of weights comprises multiple weights that are different from 1/2, wherein the weight index is represented by a bin string which is comprised in the bitstream and is used to select the weight w from the set of weights, and the bin string comprises a plurality of bins and at least one bin of the plurality of bins is bypass coded, wherein the set of weights comprises all probable weights different from 1/2 corresponding to the GBI mode, wherein the asymmetric weights comprise the weight w and a weight 1-w, wherein a first bin of the plurality of bins is coded with at least one context, wherein all other bins of the plurality of bins are bypass coded, and wherein the at least one context consists of one context, and wherein in response to the weight w being not equal to the weight 1-w, a bi-directional optical flow mode is not applied for the current block, and wherein the bi-directional optical flow mode uses gradients in different directions to derive a motion offset and a prediction offset.

20. A method for storing bitstream of a video, comprising:

making a first decision for a current block of the video regarding whether a decoder side motion vector derivation (DMVD) tool for the current block is enabled based on a size of the current block or whether a coding mode of the current block is enabled, wherein the DMVD tool derives a refinement of motion information, and wherein the DMVD tool comprises a bi-directional optical flow tool;

wherein the bi-directional optical flow tool is disabled upon a determination that the coding mode of the current block is a generalized bi-prediction (GBI) mode in which asymmetric weights in coding unit (CU)-level are applied to two prediction blocks generated from a reference picture list 0 and a reference picture list 1 to derive a final prediction block of the current block;

wherein the method further comprises:

dividing a coding tree unit (CTU) into a plurality of coding units (CUs);

constructing a motion candidate list for a current coding unit (CU);

deriving motion information for the current CU based on the motion candidate list;

dividing the current CU into a plurality of sub-CUs, when at least one condition of a size of the current CU is met;

making a second decision regarding a selective enablement of the DMVD tool at a sub-CU level;

generating the bitstream based on the first decision and the second decision; and storing the bitstream in a non-transitory computer-readable recording medium, wherein when a height (H) or a width (W) of the current CU is greater than a threshold (L), the current CU is divided into multiple sub-CUs, and wherein L is a positive integer, and L is predetermined, wherein the GBI mode is configured to select a weight w from a set of weights based on a weight index of the GBI mode to generate a bi-prediction signal for the current block, and wherein the set of weights comprises multiple weights that are different from 1/2, wherein the weight index is represented by a bin string which is comprised in the bitstream and is used to select the weight w from the set of weights, and the bin string comprises a plurality of bins and at least one bin of the plurality of bins is bypass coded, wherein the set of weights comprises all probable weights different from 1/2 corresponding to the GBI mode, wherein the asymmetric weights comprise the weight w and a weight 1-w, wherein a first bin of the plurality of bins is coded with at least one context, wherein all other bins of the plurality of bins are bypass coded, and wherein the at least one context consists of one context, and wherein in response to the weight w being not equal to the weight 1-w, a bi-directional optical flow mode is not applied for the current block, and wherein the bi-directional optical flow mode uses gradients in different directions to derive a motion offset and a prediction offset.

* * * * *